United States Patent
Kudo et al.

(10) Patent No.: US 11,044,754 B2
(45) Date of Patent: Jun. 22, 2021

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Riichi Kudo, Yokosuka (JP); Hirantha Sithira Abeysekera, Yokosuka (JP); Yasushi Takatori, Yokosuka (JP); Takeo Ichikawa, Yokosuka (JP); Masato Mizoguchi, Yokosuka (JP); Yasufumi Morioka, Tokyo (JP); Hiroto Yasuda, Tokyo (JP); Akira Yamada, Tokyo (JP); Yoshifumi Morihiro, Tokyo (JP); Yukihiko Okumura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/551,430

(22) PCT Filed: Feb. 23, 2016

(86) PCT No.: PCT/JP2016/055210
§ 371 (c)(1),
(2) Date: Aug. 16, 2017

(87) PCT Pub. No.: WO2016/136724
PCT Pub. Date: Sep. 1, 2016

(65) Prior Publication Data
US 2018/0035467 A1   Feb. 1, 2018

(30) Foreign Application Priority Data

Feb. 24, 2015 (JP) ............... JP2015-034351

(51) Int. Cl.
*H04W 74/08* (2009.01)
*H04W 84/12* (2009.01)
(Continued)

(52) U.S. Cl.
CPC ......... *H04W 74/0833* (2013.01); *H04W 4/00* (2013.01); *H04W 16/14* (2013.01);
(Continued)

(58) Field of Classification Search
None
See application file for complete search history.

(56) References Cited

U.S. PATENT DOCUMENTS

2005/0141545 A1* 6/2005 Fein ............... H04B 7/0617
370/445
2012/0099664 A1   4/2012 Cheong et al.
(Continued)

FOREIGN PATENT DOCUMENTS

| CN | 102415184 A | 4/2012 |
|---|---|---|
| CN | 103314610 A | 9/2013 |

(Continued)

OTHER PUBLICATIONS

3GPP TSG RAN WG1 #78bis R1-4402 LG Electronics "Candidate solutions for LAA operation" (Year: 2014).*
(Continued)

*Primary Examiner* — Jeffrey M Rutkowski
*Assistant Examiner* — Basil Ma
(74) *Attorney, Agent, or Firm* — Harness, Dickey & Pierce, P.L.C.

(57) ABSTRACT

A wireless user equipment performing wireless communication in a primary and a secondary frequency bands, a first wireless access point AP performing the wireless communication in the primary frequency band, and a second wireless base transceiver station BTS performing the wire-
(Continued)

less communication in the secondary frequency band are included. The AP and the BTS are connected to each other through a network. A UD report transfer unit transfers a UD report including information relating to transmission-waiting user data destined for a receiving node. The receiving node includes a transmission opportunity control unit which sets a fixed transmission prohibition time in a channel in the primary frequency band for a wireless communication device in a vicinity, obtains a transmission opportunity, grants the transmission opportunity to the transmitting node, and causes the user data to be transmitted from the transmitting node according to the transferred UD report.

10 Claims, 13 Drawing Sheets

(51) Int. Cl.
 H04W 92/20 (2009.01)
 H04W 4/00 (2018.01)
 H04W 16/14 (2009.01)
 H04W 72/04 (2009.01)
(52) U.S. Cl.
 CPC ......... *H04W 72/04* (2013.01); *H04W 72/044* (2013.01); *H04W 72/0406* (2013.01); *H04W 84/12* (2013.01); *H04W 92/20* (2013.01)

(56) References Cited

U.S. PATENT DOCUMENTS

| | | | |
|---|---|---|---|
| 2013/0294356 A1 | 11/2013 | Bala et al. | |
| 2014/0254524 A1 | 9/2014 | Cheng et al. | |
| 2015/0131536 A1 | 5/2015 | Kaur et al. | |
| 2015/0223075 A1* | 8/2015 | Bashar ................ | H04W 16/14 370/329 |
| 2016/0014610 A1* | 1/2016 | Wong .................. | H04W 74/002 455/454 |
| 2016/0066195 A1* | 3/2016 | Moon ................. | H04L 27/0006 455/454 |
| 2016/0095110 A1* | 3/2016 | Li ....................... | H04W 72/1215 370/329 |
| 2016/0227578 A1* | 8/2016 | Lee ..................... | H04W 74/0816 |
| 2017/0118765 A1 | 4/2017 | Kalhan | |
| 2017/0208627 A1 | 7/2017 | You et al. | |
| 2017/0339699 A1 | 11/2017 | Bhorkar et al. | |
| 2018/0041998 A1 | 2/2018 | Freda et al. | |

FOREIGN PATENT DOCUMENTS

| | | |
|---|---|---|
| EP | 2429250 A1 | 3/2012 |
| JP | 2014-99743 A | 5/2014 |
| KR | 10-2013-0133204 A | 12/2013 |
| KR | 10-2014-0017517 A | 2/2014 |
| WO | WO-2011/121373 A1 | 10/2011 |
| WO | WO-2012/078565 A1 | 6/2012 |
| WO | WO-2012074343 A2 | 6/2012 |
| WO | WO-2014/112563 A1 | 7/2014 |

OTHER PUBLICATIONS

International Search Report for PCT/JP2016/055210, ISA/JP, Tokyo, dated May 17, 2016, with translation.
Written Opinion of the ISA for PCT/JP2016/055210, ISa/JP, Tokyo, dated May 17, 2016.
Riichi Kudo et al., "Performance evaluation of unlicensed band access for future radio access mobile optical network", IEICE Technical Report, vol. 114, No. 295, Nov. 5, 2014 (Nov. 5, 2014), pp. 61 to 66 with English translation thereof.
IEEE Std 802.11ac (TM)-2013, IEEE Standard for Information technology Telecommunications and information exchange between systems Local and metropolitan area networks—Specific requirements, Part 11: Wireless LAN Medium Access Control (MAC) and Physical Layer (PHY) Specifications, Dec. 2013.
RP-140057, "On the primacy of licensed spectrum in relation to the proposal of using LTE for a license-assisted access to unlicensed spectrum," 3GPP TSG-RAN #63, Mar. 2014.
U.S. Office Action for U.S. Appl. No. 15/329,188 dated Apr. 5, 2018, 27 pages.
Response to U.S. Office Action for U.S. Appl. No. 15/329,188, filed Jul. 2, 2018, 18 pages.
Korean Office Action in parallel application KR 10-2017-7023419, KIPO, dated Jan. 24, 2018, with English (machine) translation thereof.
3GPP TR 36.889 V0.3.1. (Feb. 2015) Technical Report, 3rd Generation Partnership Project; Technical Specification Group Radio Access Network; Study on Licensed-Assisted Access to Unlicensed Spectrum; (Release 13), 2015.
3GPP TSG RAN WG1 Meeting #78bis, Ljubljana, Slovenia, Oct. 6-10, 2014, R1-144042.
3GPP TSG-RAN WG1 Meeting #80, Athens, Greece, Feb. 9-13, 2015, R1-150420.
Extended European Search Report for counterpart application EP 16755468.2, EPO, Munich, dated Sep. 25, 2018.
Riichi Kudo et al: "Channel Access Acquisition Mechanism Coupled with Cellular Network for Unlicensed Spectrum", 2015 IEEE 81st Vehicular Technology Conference (VTC Spring), Jan. 1, 2015 (Jan. 1, 2015), pp. 1-5, XP055365785, DOI: 10.1109/VTCSpring.2015. 7145734.
Japanese Office Action (Notification of Reasons for Refusal) in corresponding Japanese application JP 2015-034351, JPO, dated Apr. 4, 2018, with English translation thereof.
International Preliminary Report on Patentability for PCT/JP2016/055210, dated Aug. 29, 2017.
3GPP TS 36.300 V10.6.0 (Dec. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
Samsung, Load balancing between 3GPP and WLAN[online], 3GPP TSG-RAN WG2#81 bis R2-131181, Internat,URL:http://www.3gpp.org/ftp/tsg_ran/WG2_RL2/TSGR2_81bis/Docs/R2-131181.zip>, Apr. 5, 2013, 1-4 pages.
International Search Report for PCT/JP2015/073381, ISA/JP, dated Nov. 10, 2015.
Korean Office Action for parallel application KR10-2017-7003324, KIPO, dated Jun. 15, 2017, with English translation thereof.
Extended European Search Report including the supplementary European search report and the European search opinion for parallel application EP 15833321.1, EPO, Munich, dated Feb. 16, 2018.
International Preliminary Report on Patentability for PCT/JP2016/055210, dated Aug. 29, 2017 with English translation thereof.
Chinese Office Action regarding Application No. 201680011999.7, dated Dec. 25, 2019.
European Office Action regarding EP167554682, dated Nov. 4, 2019.
Chinese Office Action regarding CNSN 201580043172X, dated Jun. 17, 2019.
U.S. Appl. No. 15/329,188, filed Jan. 25, 2017, Riichi Kudo, Hirantha Sithira Abeysekera, Yasushi Takatori, Takeo Ichikawa, Yusuke Asai, Masato Mizoguchi.

* cited by examiner (a)

(b)

(a)

(b)

WIRELESS COMMUNICATION SYSTEM AND WIRELESS COMMUNICATION METHOD

CROSS REFERENCE TO RELATED APPLICATION

This application is a U.S. National Stage application claiming the benefit of prior filed International Application Number PCT/JP2016/055210, filed on Feb. 23, 2016, in which the International Application claims priority from Japanese Patent Application Number 2015-034351, filed on Feb. 24, 2015, the entire contents of which are incorporated herein by reference.

TECHNICAL FIELD

The present invention relates to a wireless communication system and a wireless communication method, in which a transmission opportunity that is obtained by a receiving node is granted to a transmitting node and thus causes user data to be transmitted, when a wireless access point and a wireless station perform wireless communication based on a random access scheme in a primary frequency band that is an unlicensed band. Here, the transmitting node is the wireless access point in downlink communication or is the wireless station in uplink communication. The receiving node is the wireless station in the downlink communication or is the wireless access point in the uplink communication.

The present invention relates particularly to a wireless communication system and a wireless communication method in which a means by which the transmitting node transfers to the receiving node a user data report (hereinafter referred to as a UD report) that is information relating to transmission-waiting user data is established, the receiving node sets a Network Allocation Vector (NAV) that is a transmission prohibition time in a primary frequency band, based on the UD report, obtains a transmission opportunity, and grants the transmission opportunity to the transmitting node, and the transmitting node transmits the user data.

BACKGROUND ART

A wireless Local Area Network (LAN) system that complies with international standard specifications IEEE 802.11 that are disclosed in Non-Patent Document 1 improves its throughput yearly, and has come into widespread use as one system of main wireless access. Because the wireless LAN system can use an unlicensed band that is a frequency band of which the licensing is unnecessary, various wireless stations have come into widespread use. Particularly, the widespread use of smartphones remarkably has provided more opportunity for the use of the wireless LAN systems.

The unlicensed band that is a frequency band which is used by the wireless LAN system is allocated to a 2.4 GHz band, a 5 GHz band, and a 60 GHz. In the 2.4 GHz band and the 5 GHz band that are microwave bands, a band that can be used by the wireless LAN system in Japan is approximately 500 MHz. Furthermore, bands that are equivalent to or equal to or higher than those bands are allocated, as bands that are available for the wireless LAN system, in countries other than Japan. On the other hand, because wireless communication in the unlicensed band is performed based on a random access scheme, such as Carrier Sense Multiple Access/Collision Avoidance (CSMA/CA), a hidden terminal problem is a serious obstacle. Flow control that uses a Request to Send (RTS)/Clear to Send (CTS) is proposed for the purpose of solving the hidden terminal problem.

Here, as illustrated in FIG. 12, a situation is assumed in which two wireless LAN's are present in an area where a transmitting node TX and a receiving node RX perform communication using an unlicensed band, the transmitting node TX and the receiving node RX are present at positions where wireless signals of a wireless access point APa and a wireless station STAa on a wireless LANa that is one wireless network can be detected, and only the receiving node RX is present at a position where wireless signals of a wireless access point APb and a wireless station STAb on a wireless LANb that is the other wireless network can be detected. The transmitting node TX is set to be unable to detect transmission signals from the wireless access point APb and the wireless station STAb that constitute the wireless LANb. It is noted that if the transmitting node TX is the wireless access point and the receiving node RX is the wireless station, the downlink communication is to be performed, and that if the transmitting node TX is the wireless station and the receiving node RX is the wireless access point, the uplink communication is to be performed.

Before the transmitting node TX transmits the user data to the receiving node RX, the transmitting node TX transmits an RTS frame, the receiving node RX transmits a CTS frame, the wireless access point APa and the wireless station STAa on the wireless LANa set the NAV according to the RTS frame or the CTS frame, and the wireless access point APb and the wireless station STAb on the wireless LANb set the NAV according to the CTS frame that is transmitted by the receiving node RX. Accordingly, the wireless LANa stops the communication, the wireless LANb that is a hidden terminal when viewed from the transmitting node TX stops the communication, and the transmitting node TX can perform the transmission to the receiving node RX in a wireless channel in which a transmission opportunity for a random access is obtained.

In this manner, with exchange of the RTS frame and the CTS frame, even if a wireless signal on the wireless LANb, which cannot be detected from the transmitting node TX is present in the receiving node RX, the receiving node RX sets the NAV with the CTS frame according to the RTS frame from the transmitting node TX, and thus the hidden terminal problem can be solved thereby preventing a decrease in throughput.

Incidentally, even in 3GPP that is a standard body, which is disclosed in non-patent Document 2, a discussion on a cellular system that uses the unlicensed band on the wireless LAN has started and the attention has been focused on a method of utilizing the unlicensed band. That is, in the cellular system in compliance with specifications for the unlicensed band, the utilization of the frequency band for the wireless LAN has been under study.

Non-Patent Document 1: IEEE Std 802.11ac™-2013, IEEE Standard for Information technology-Telecommunications and information exchange between systems Local and metropolitan area networks-Specific requirements, Part 11: Wireless LAN Medium Access Control (MAC) and Physical Layer (PHY) Specifications, December 2013

Non-Patent Document 2: RP-140057, "On the primacy of licensed spectrum in relation to the proposal of using LTE for a licensed-assisted access to unlicensed spectrum", 3GPP TSG-RAN #63, March 2014.

Disclosure Problems to be Solved

However, for example, in a situation that is illustrated in FIG. 12, a wireless signal on the wireless LANb that is the hidden terminal when viewed from the transmitting node TX is always transmitted, and in an environment in which a wireless resource is in short supply, the RTS frame that is transmitted from the transmitting node TX collides and thus is not received by the receiving node RX, or with the NAV that is set, from the wireless LANb, by the receiving node RX, the CTS frame cannot be transmitted in response to the RTS frame that is transmitted from the transmitting node TX. Thus, an effect of the obtaining of the transmission opportunity based on the RTS/CTS is limited. That is, if a utilization level of a wireless resource for traffic on the wireless LANb that uses the unlicensed band is high, there is a problem in that the wireless LANb that is the hidden terminal when viewed from the transmitting node TX causes a remarkable decrease in throughput between the transmitting node TX and the receiving node RX.

Here, the transmitting node TX sets the NAV for the wireless LANa using the RTS/CTS and obtains the transmission opportunity to transmit data frame. Additionally, the receiving node RX sets the NAV for the wireless LANb that is the hidden terminal from the transmitting node TX, and thus obtains the transmission opportunity and grants the transmission opportunity from the receiving node RX to the transmitting node TX. Then, if the transmitting node TX can transmit the data frame with the granted transmission opportunity, an influence of the hidden terminal in the transmitting node TX can be reduced and an improvement in throughput between the transmitting node TX and the receiving node RX can be expected. However, in order for the receiving node RX to efficiently perform the communication based on the obtaining of the transmission opportunity, a means by which information relating to transmission-waiting user data in the transmitting node TX is transmitted to the receiving node RX and a means by which the communication based on the granted transmission opportunity is started and ended are problems to be solved. When wireless communication based on the obtaining of the transmission opportunity in the receiving node RX is performed without the information relating to the transmission-waiting user data, there are times when a state where the user data is not present on the transmitting side occurs regardless of the fact that the transmission opportunity is obtained in the receiving node RX. At this time, there is a problem in that because the frame is transmitted or the NAV is set for a neighboring terminal in the receiving node RX to obtain the transmission opportunity, wireless resources are wastefully consumed. Furthermore, in an environment where many transmitting nodes that are intended to utilize the same wireless resource are present in the vicinity, when only the transmitting node TX is intended to obtain the transmission opportunity, there is a problem in that the frequency with which the transmission is performed cannot be sufficiently obtained in the random access scheme.

A proposition of the present invention is to provide a wireless communication system and a wireless communication method in which not only does a transmitting node obtain a transmission opportunity for random access, but also a receiving node obtains a transmission opportunity based on information relating to transmission-waiting data in the transmitting node, and grants the transmission opportunity to the transmitting node, thereby making it possible to transmit user data with an influence of a hidden terminal in the transmitting node being reduced, and thereby causing the receiving node to obtain the transmission opportunity to increase the number of nodes that are intended to perform transmission in a random access scheme and to increase the frequency with which the transmitting node performs the transmission.

Means for Solving the Problems

According to a first invention, there is provided a wireless communication system which includes one or more wireless stations having a function of performing wireless communication based on a random access scheme in a primary frequency band and a function of performing the wireless communication in a secondary frequency band which is different from the primary frequency band, a first wireless access point performing the wireless communication with the wireless stations based on the random access scheme in the primary frequency band, and a second wireless access point performing the wireless communication with the wireless stations in the secondary frequency band, in which the first wireless access point and the second wireless access point are connected to each other through a network, the system includes when a node transmitting user data is defined as a transmitting node and a node receiving the user data is defined as a receiving node for the first wireless access point and the wireless stations, a UD report transfer unit transferring a UD report which includes information relating to transmission-waiting user data destined for the receiving node from the transmitting node to the receiving node through the second wireless access point, in which according to the UD report being transferred, the receiving node includes a transmission opportunity control unit which sets a fixed transmission prohibition time in a channel in the primary frequency band for a wireless communication device in a vicinity, obtains a transmission opportunity, grants the transmission opportunity to the transmitting node, and causes the user data to be transmitted from the transmitting node.

In the wireless communication system according to the first invention, when the transmitting node is the first wireless access point, the UD report transfer unit is configured to transfer the UD report relating to the transmission-waiting user data which is destined for a wireless station and which is generated in the network, the first wireless access point, or the second wireless access point from the second wireless access point to the wireless stations.

In the wireless communication system according to the first invention, when the transmitting node is the wireless stations, the UD report transfer unit is configured to transfer the UD report which is related to the transmission-waiting user data destined for the first wireless access point and which is generated in a wireless station to the first wireless access point through the second wireless access point.

In the wireless communication system according to the first invention, the first wireless access point and a plurality of the wireless stations are configured to be capable of performing multi-user simultaneous communication; the UD report transfer unit is configured to transfer the UD report through the second wireless access point between the first wireless access point and the plurality of wireless stations performing the multi-user simultaneous communication; and after the transmission opportunity control unit of the receiving node obtains and grants the transmission opportunity based on the UD report, the first wireless access point is configured to determine whether or not to perform the multi-user simultaneous communication and then to perform the multi-user simultaneous communication.

In the wireless communication system according to the first invention, the UD report transfer unit is configured to add to the user data which is transmitted from the transmitting node to the receiving node the UD report and to transfer the user data, the UD report includes a communication condition, starting and continuation conditions, or a termination command for communication based on the obtaining and the granting of the transmission opportunity in the receiving node; and the transmission opportunity control unit of the receiving node is configured to perform update or termination of the condition for the communication based the obtaining and the granting of the transmission opportunity in the receiving node based on the UD report beings added to the user data.

In the wireless communication system according to the first invention, the UD report transfer unit is configured to determine whether transmission opportunity communication for performing communication based on the obtaining and the granting of the transmission opportunity in the receiving node is possible or not from at least one of wireless environment information measured in the first wireless access point, wireless environment information measured in the wireless station, traffic information of the second wireless access point, a configuration of a network between the first wireless access point and the second wireless access point, and a type of user grade, and to generate the UD report when the communication based on the obtaining and the granting of the transmission opportunity in the receiving node is determined to be enabled.

In the wireless communication system according to the first invention, when channel utilization measured at the transmitting node is lower than a predetermined value, the UD report transfer unit is configured to generate the UD report for causing the receiving node to obtain the transmission opportunity.

In the wireless communication system according to the first invention, the UD report includes an access category of the transmission-waiting user data.

In the wireless communication system according to the first invention, the UD report includes information designating a length of the transmission prohibition time and a change in the length of the transmission prohibition time, the transmission prohibition time is set when the receiving node obtains the transmission opportunity.

In the wireless communication system according to the first invention, the UD report includes, as information relating to the transmission-waiting user data, at least one of requested throughput of an uplink or a downlink operating in a channel in a first frequency, requested throughput for communication based on obtaining and the granting of the transmission opportunity in the receiving node in the uplink or the downlink operating in the channel in the first frequency, a presence of the transmission-waiting user data in the transmitting node, a total amount of the transmission-waiting user data in the transmitting node, a number of times that the communication based on the obtaining and the granting of the transmission opportunity in the receiving node is performed, a frequency with which the communication based on the obtaining and the granting of the transmission opportunity in the receiving node is performed, a starting time at which the communication based on the obtaining and the granting of the transmission opportunity in the receiving node is performed, and an instruction to perform one communication based the obtaining and the granting of the transmission opportunity in the receiving node.

According to a second invention, there is provided a wireless communication method for use in a wireless communication system that includes one or more wireless stations having a function of performing wireless communication based on a random access scheme in a primary frequency band and a function of performing the wireless communication in a secondary frequency band which is different from the primary frequency band, a first wireless access point performing the wireless communication with the wireless stations in the primary frequency band, and a second wireless access point performing the wireless communication with the wireless stations in the secondary frequency band, in which the first wireless access point and the second wireless access point are connected to each other through a network, the method includes when a node transmitting user data is defined as a transmitting node and a node receiving the user data is defined as a receiving node for the first wireless access point and the wireless stations, a first step in which a transmitting node or the network generates information relating to transmission-waiting user data destined for a receiving node as a UD report; a second step in which the second wireless access point transfers the generated UD report to the receiving node; and a third step in which, according to the transferred UD report, the receiving node sets a fixed transmission prohibition time in a channel in a primary frequency band for a wireless communication device in a vicinity, obtains a transmission opportunity, grants the transmission opportunity to the transmitting node, and causes user data to be transmitted from the transmitting node.

Effects

According to the present invention, when performing communication between a first wireless access point and a wireless station, using a primary frequency band that is unlicensed band in which wireless communication that is based on a random access scheme is performed, a transmitting node on the side that transmits user data transfers a UD report relating to transmission-waiting user data to a receiving node, and the receiving node obtains a transmission opportunity in a primary frequency band based on the UD report and grants the transmission opportunity to the transmitting node, and causes the user data to be transmitted from the transmitting node, thereby making it possible to improve throughput in the primary frequency band.

DETAILED DESCRIPTION OF THE EMBODIMENTS

First Embodiment

Figure 1:
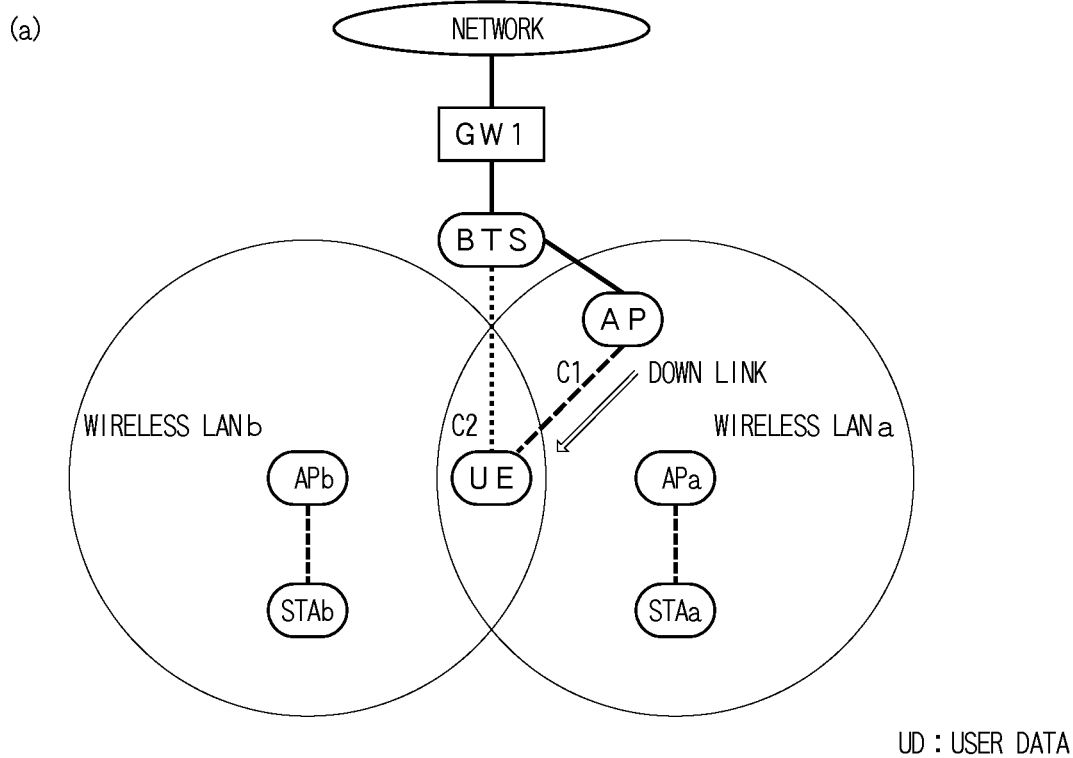
FIG. 1 is a diagram illustrating a user data transmission procedure in downlink communication according to a first embodiment of the present invention.
Figure 1:
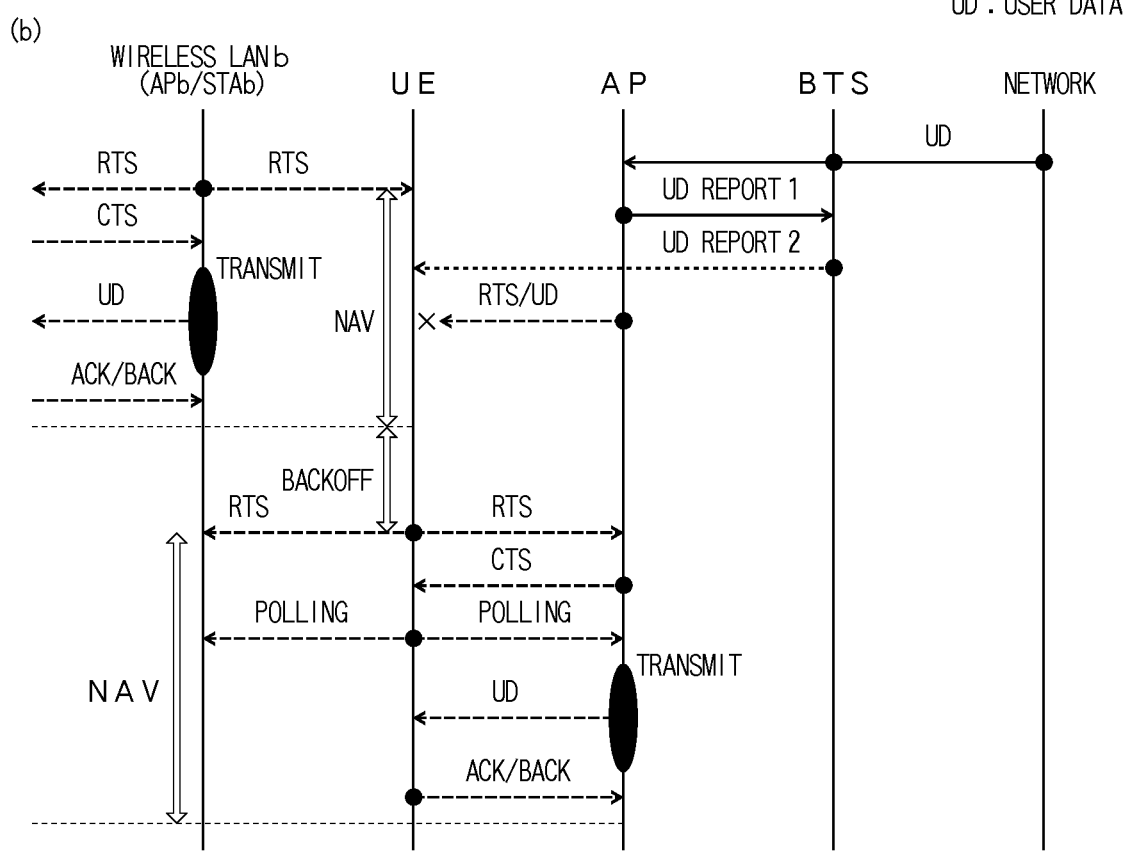

FIG. 1 indicates a user data transmission procedure for downlink communication according to a first embodiment of the present invention. From here on, a transmitting node TX is a wireless access point AP, and a receiving node RX is a wireless user equipment UE.

In FIG. 1, a wireless communication system according to the present invention is configured to include a wireless access point AP that performs communication based on a random access scheme on a channel C1 in a primary frequency band, a wireless base transceiver station BTS that performs communication on a channel C2 in a secondary frequency band that is a frequency band different from the primary frequency band, and a wireless user equipment UE that is capable of performing communication on both of the channel C1 in the primary frequency band and the channel C2 in the secondary frequency band.

The channel C1 in the primary frequency band is assumed to be, for example, in a 400 to 900 MHz band, a 2.4 GHz band, a 5 GHz band, a 60 GHz band, or so on, as an unlicensed band that is used for a wireless LAN. The channel C2 in the secondary frequency band is assumed to be, for example, in a licensed band that is used for a cellular system. Frequencies that are stipulated in the third-generation mobile telephone, Long-Term Evolution (LTE), LTE-Advanced, and the fifth-generation new radio access technology (RAT) can be used for the channel C2 in the secondary frequency band. Based on the random access scheme, the wireless access point AP and the wireless user equipment UE that use the channel C1 in an unlicensed band can perform wireless communication that is decided, for example, in compliance with IEEE 802.11 for wireless LAN, standard specifications IEEE 802.15 for wireless Personal Area Network (PAN), and LTE-Licensed Assisted Access (LAA) that is the specification for utilization of an unlicensed band which is decided in 3GPP specifications.

Here, in the first embodiment, in a surrounding environment where the downlink communication from the wireless access point AP to the wireless user equipment UE is intended to be realized, an arrangement is intended to be made in which two wireless LAN's that use an unlicensed band, for example, are present, the wireless access point AP and the wireless user equipment UE are present at positions where wireless signals of a wireless access point APa and a wireless station STAa on a wireless LANa that is one of the two wireless LAN's can be detected, and only the wireless user equipment UE is present at a position where wireless signals of a wireless access point APb and a wireless station STAb on a wireless LANb that is the other one can be detected.

In this arrangement, as described above, the wireless access point AP is enabled to obtain a transmission opportunity by setting a NAV for the wireless LANa using an RTS/CTS, and the wireless user equipment UE is enabled to obtain a transmission opportunity by setting a NAV for the wireless LANb which is a hidden terminal from the wireless access point AP and to grant the transmission opportunity to the wireless access point AP. However, in order for the wireless user equipment UE to obtain the transmission opportunity, because means is necessary that transfers information relating to transmission-waiting user data in the wireless access point AP, to the wireless user equipment UE, the wireless base transceiver station BTS is used as this means. That is, a configuration is employed in which the wireless base transceiver station BTS that uses a licensed band is used, in order to reduce the extent of a decrease in throughput due to an influence of the hidden terminal in the downlink communication from the wireless access point AP to the wireless user equipment UE, which uses the unlicensed band. Here, a transmitting node is the wireless access point AP in the downlink communication according to the first embodiment, and is a wireless user equipment UE in uplink communication according to a second embodiment that will be described below, but an information block in which the information relating to the transmission-waiting user data in the transmitting node is stored is defined as a UD report.

Figure 2:
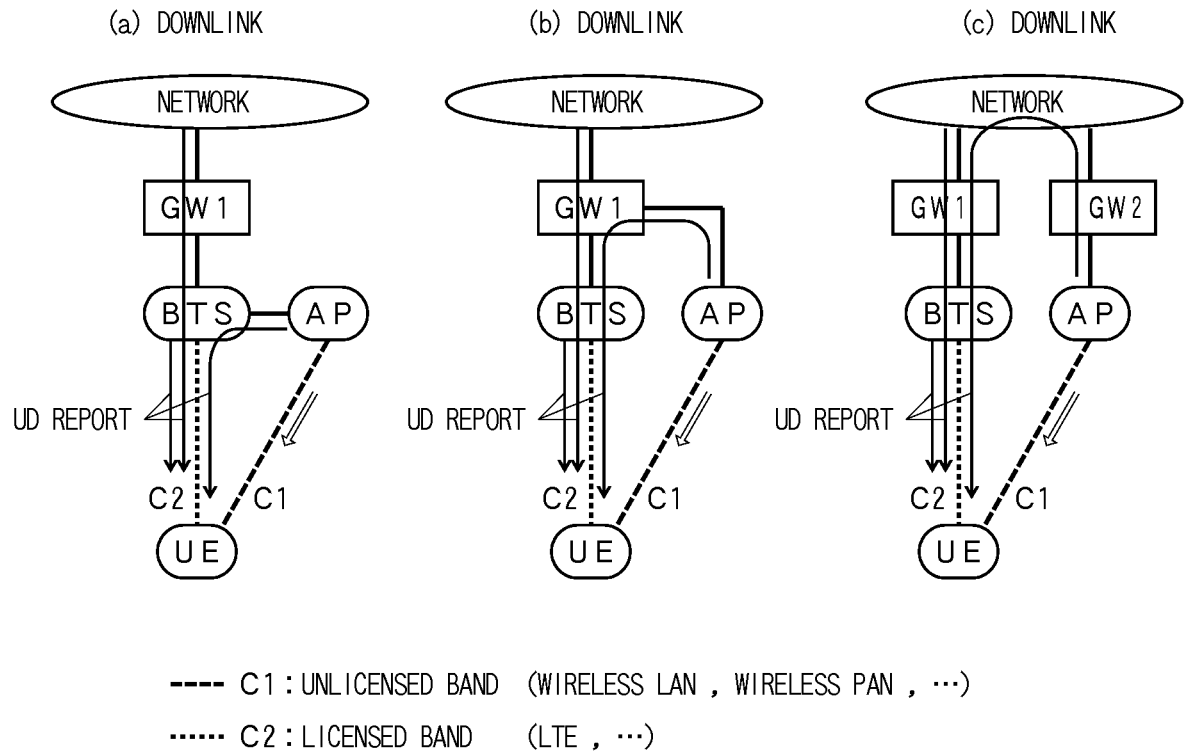
FIG. 2 is a diagram illustrating an example of a configuration of a wireless communication system according to the present invention.
Figure 2:
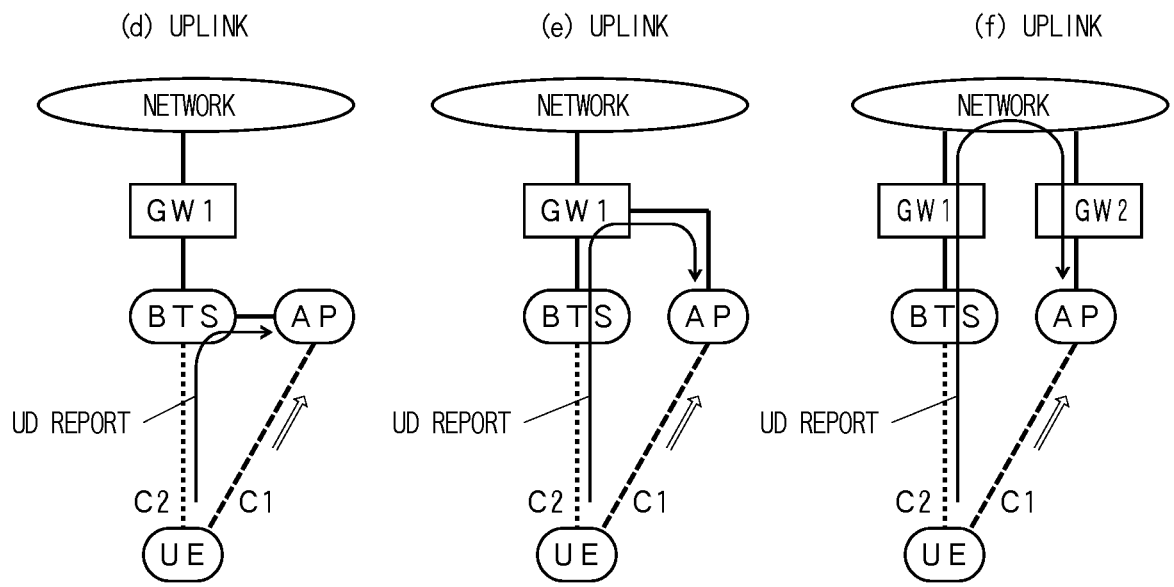

The wireless base transceiver station BTS is connected to a network through a gateway GW1. The network is the Internet or a mobile communication network. Furthermore, the following three types of connection for the wireless access point AP are considered. The wireless access point AP in FIG. 1 and (a) of FIG. 2 is connected to the network through the wireless base transceiver station BTS and the gateway GW1. The wireless access point AP in (b) of FIG. 2 is connected to the network through the gateway GW1. The wireless access point AP in (c) of FIG. 2 is connected to the network through a gateway GW2. That is, there is a type of connection in which the wireless access point AP and the wireless base transceiver station BTS are connected directly to each other as illustrated in FIG. 1 and (a) of FIG. 2, a type of connection in which the wireless access point AP and the wireless base transceiver station BTS are connected to each other through the gateway GW1 as illustrated in (b) of FIG. 2, and a type of connection in which the wireless access point AP and the wireless base transceiver station BTS are connected to each other through the network as illustrated in (c) of FIG. 2. In a case in (a) of FIG. 2, the wireless base transceiver station BTS and the wireless access point AP may be integrated into one base transceiver station or one wireless access point.

In (a), (b), and (c) of FIG. 2, a transfer path for the UD report by the wireless access point AP that is the transmitting node TX in the downlink communication. The UD report by the wireless access point AP is generated in the network, the wireless base transceiver station BTS, or the wireless access point AP, and transferred from the wireless base transceiver station BTS to the wireless user equipment UE.

(d), (e), and (f) of FIG. 2 illustrate the transfer path for the UD report by the wireless user equipment UE that is the transmitting node TX in the uplink communication. The UD report by the wireless user equipment UE is generated in the wireless user equipment UE and is transferred to the wireless access point AP. The details will be described in the second embodiment.

In a sequence that is illustrated in FIG. 1, user data over a downlink is generated in the network, is transferred to the wireless access point AP through the gateway GW1 and the wireless base transceiver station BTS, and, after normally a transmission opportunity on the wireless LANa is obtained by the wireless access point AP, is transmitted to the wireless user equipment UE (this is not illustrated). Here, in the wireless user equipment UE that is a destination of transmission from the wireless access point AP, a wireless signal of the wireless LANb, which cannot be detected, is received from the wireless access point AP. In this environment, although the wireless access point AP obtains a transmission opportunity on the wireless LANa and performs transmission to the wireless user equipment UE, if the wireless user equipment UE receives the wireless signal of the wireless LANb, or if the NAV is set from the wireless LANb, there is a high likelihood that a failure in communication will take place. It is noted that because user data that is transmitted from the wireless base transceiver station BTS to the wireless user equipment UE has no direct relationship to a control flow according to the present invention, a description thereof is omitted.

The UD report is generated in a channel access right communication management unit. The following four types of places where the channel access right communication management unit is included are assumed.

Figure 9:
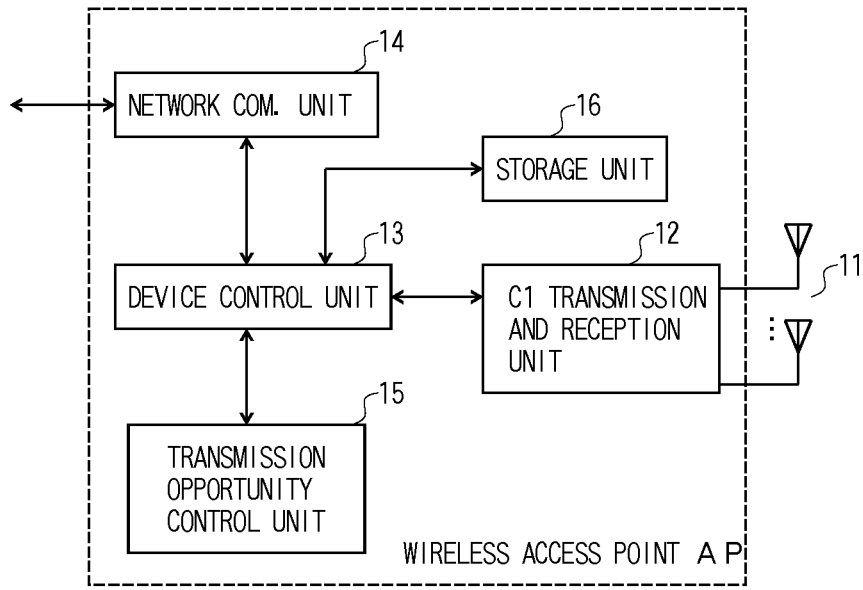
FIG. 9 is a diagram illustrating an example of a configuration of the wireless access point AP in the wireless communication system according to the present invention.

Type 1: Case where the wireless access point AP includes the channel access right communication management unit (which corresponds to a transmission opportunity control unit 15 that is illustrated in FIG. 9)

Figure 10:
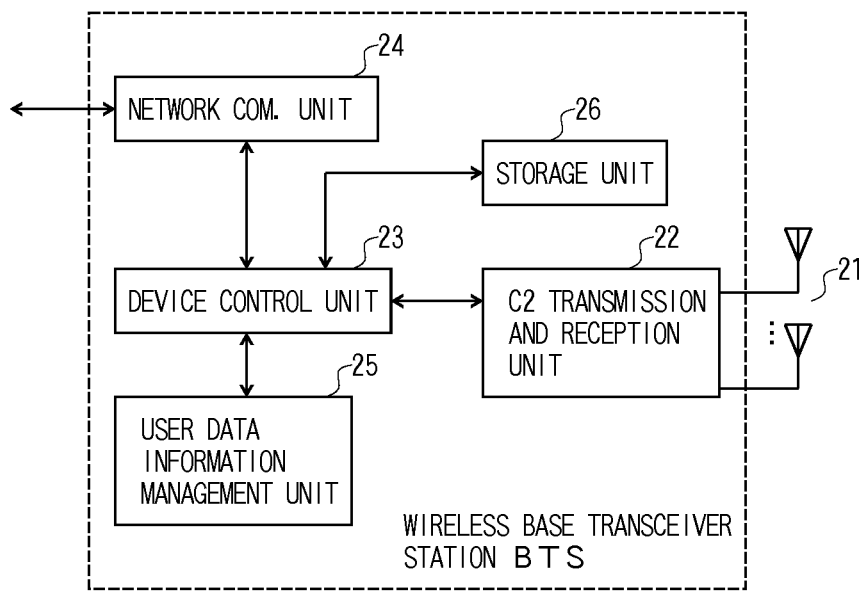
FIG. 10 is a diagram illustrating an example of a configuration of a wireless base transceiver station BTS in the wireless communication system according to the present invention.

Type 2: Case where the wireless base transceiver station BTS includes the channel access right communication management unit (which corresponds to a user data information management unit 25 that is illustrated in FIG. 10)

Figure 11:
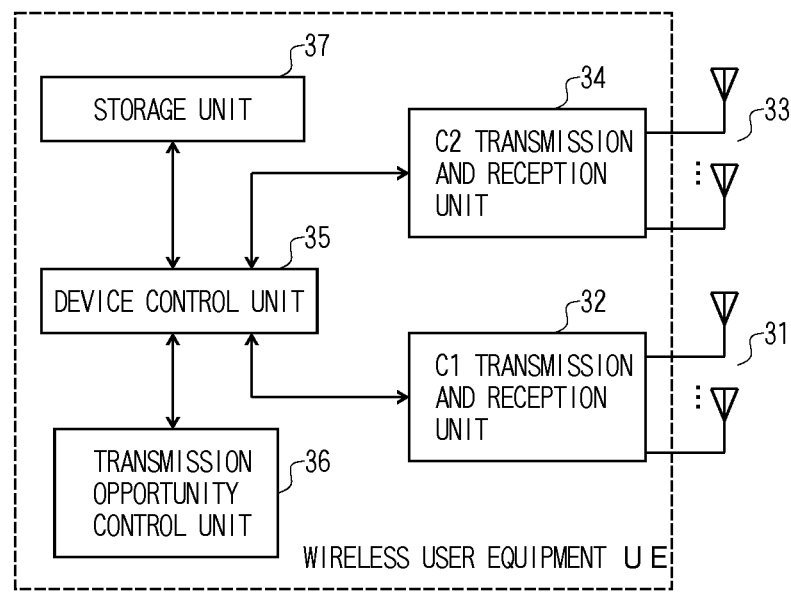
FIG. 11 is a diagram illustrating an example of a configuration of a wireless user equipment UE in the wireless communication system according to the present invention.

Type 3: Case where the wireless user equipment UE includes the channel access right communication management unit (which corresponds to a transmission opportunity control unit 36 that is illustrated in FIG. 11)

Type 4: Case where an independent channel access right communication management unit that is connected to the network is made to be present Furthermore, different types of channel access right communication management units for an uplink and a downlink may be included, or a plurality of channel access right communication management units may be present in a mixed manner. In the first embodiment, because the UD report is generated in a device that is capable of recognizing user data that is stored in the wireless access point AP, Types 1, 2, and 4 are mainly assumed. If Type 4 is assumed, the channel access right communication management unit causes a path for the user data to be notified by a block that manages the path for the user data to the wireless access point AP, or the block that manages the path for the user data is arranged to have the channel access right communication management unit. The channel access right communication management unit may decide a path for wireless traffic to a receiving node or may decide utilization of communication based on the obtaining and granting of the transmission opportunity in the receiving node according to the present invention.

In the sequence that is illustrated in FIG. 1, an example in which the UD report is generated in the wireless access point AP is illustrated. The wireless access point AP transfers the information relating to the transmission-waiting user data that is destined for the wireless user equipment UE, as a UD report 1, to the wireless base transceiver station BTS, and transfers that information, as a UD report 2, from the wireless base transceiver station BTS to the wireless user equipment UE. If the channel access right communication management unit is present within the wireless base transceiver station BTS, because the user data is transferred to the wireless access point AP through the wireless base transceiver station BTS, it is possible that the channel access right communication management unit of the wireless base transceiver station BTS predicts an amount of user data in the wireless access point AP, and the UD report 2 can be generated and be transmitted from the wireless base transceiver station BTS to the wireless user equipment UE. If the channel access right communication management unit is present on the network, the UD report 1 is arranged to be generated in the channel access right communication management unit on the network and be transmitted to the BTS.

If Type 1 in which the channel access right communication management unit is present in the wireless access point AP is assumed, as illustrated in FIG. 1, the UD report 1 is generated in the wireless access point AP, and is transmitted, as the UD report 2, to the wireless user equipment UE through the wireless base transceiver station BTS. If Type 2 in which the channel access right communication management unit is present in the wireless base transceiver station BTS is assumed, the wireless base transceiver station BTS makes a decision in such a manner that the user data is transferred from the network to the wireless access point AP through the GW 1 or the GW2, estimates the transmission-waiting user data in the wireless access point AP, and thus generates the UD report 2 and transmits the generated UD report to the wireless user equipment UE. If Type 2 is assumed, the UD report 1 is not generated. If Type 4 in which the channel access right communication management unit is present on the network, the channel access right communication management unit knows the path for the user data, estimates the transmission-waiting user data in the wireless access point AP, and thus generates the UD report 1 and transfers the UD report 1 from the network to the wireless base transceiver station BTS. In this case, the UD report 1 in FIG. 1 is not transferred from the wireless access point AP to the wireless base transceiver station BTS, and is transferred from the network to the wireless base transceiver station BTS. In Type 3, as a result of combining other Types, 1, 2, and 4, the wireless user equipment UE can have the channel access right communication management unit. That is, there is a case where the wireless access point AP knows the presence of the wireless user equipment UE in advance through the transmission-waiting UD report and then a decision is made in such a manner that the transmission opportunity is obtained for the wireless access point AP. If a user who possesses the wireless user equipment UE decides to utilize the present invention, the obtaining and granting of the transmission opportunity according to Type 3 can be performed.

It is noted that the UD report 1 which is transferred from the wireless access point AP or the network to the wireless base transceiver station BTS and the UD report 2 which is transferred from the wireless base transceiver station BTS to the wireless user equipment UE may be the same or be different from each other. Here, categorization takes place according to a transfer type of transferring section. The UD report 1 is transferred over a backhaul wired circuit, and the UD report 2 is transferred over a wireless circuit. It is desirable that any one of the UD report 1 and the UD report 2 is configured to a minimum in such a manner that a load on the circuit is reduced, and particularly the UD report 2 that uses the wireless circuit needs to be compressed. Details of the UD report are introduced during description with reference to FIG. 6.

When receiving the UD report 2 from the wireless base transceiver station BTS, the wireless user equipment UE recognizes that communication based on the obtaining and granting of the transmission opportunity necessary for the downlink communication by the wireless access point AP needs to be supported. On the other hand, the wireless access point AP can also continue the downlink communication of the user data, based on obtaining the transmission opportunity, and can also wait until the transmission opportunity that is obtained by the wireless user equipment UE is granted. In FIG. 1, the wireless access point AP performs the downlink communication based on obtaining the transmission opportunity, and accordingly transmits an RTS frame or user data, but because the wireless LANb is in communication, a frame collision takes place in the wireless user equipment UE, leading to the failure in communication. In a state where the wireless signal of the wireless LANb cannot be detected, although the wireless access point AP transmits an RTS or user data frame, if the wireless LANb is in communication, there is a high likelihood that the wireless user equipment UE will fail in reception.

In order to receive the user data that is transmitted by the wireless access point AP based on the UD report 2, the wireless user equipment UE starts processing that obtains a transmission opportunity to transmit a transmission opportunity-obtaining frame for setting a NAV, a Contention Free Period (CFP), or the like for a neighboring wireless device. An example of a setting of the NAV as a transmission prohibition section is illustrated in FIG. 1 and other figures, but although the CFP is set, any transmission prohibition section that is realized by other frames may be available. For example, as the transmission opportunity-obtaining frame, an RTS frame, a CTS frame, a polling frame, a null data packet request (NDPR), a null data packet (NDP), and the like can be used. Here, the wireless user equipment UE transmits the RTS frame with random access control when the wireless LANb is not in communication, and sets the NAV for the wireless LANb, and thus creates a situation in which transmission from the wireless access point AP is possible. In the example in FIG. 1, the wireless access point AP transmits a CTS frame in response to the RTS frame transmitted by the wireless user equipment UE, and mutually sets the NAV for a neighboring wireless device. Thereafter, the wireless user equipment UE grants a transmission opportunity that is obtained with the polling frame, to the wireless access point AP, and requests the wireless access point AP to transmit user data.

The exchange of the RTS/CTS between the wireless user equipment UE and the wireless access point AP or the exchange of frames having the same function has a merit in that an unnecessary NAV can be prevented from being set for a neighboring wireless device so that the CTS frame is not transmitted when a wireless signal hidden from the wireless user equipment UE is detected in the wireless access point AP and a polling frame cannot be transmitted in a next step. That is, the wireless LANb receives the RTS frame that is transmitted by the wireless user equipment UE and then sets the NAV. However, if a reception of a next wireless frame transmitted after normal reception of the CTS frame, such as reception of the polling frame transmitted by the wireless user equipment UE, cannot be ensured, the wireless LANb does not stop transmission unnecessarily by canceling the NAV that is set with the RTS frame.

Furthermore, if the transmission opportunity is directly obtained with the polling frame, the polling frame is received in a neighboring wireless station on the wireless LANb, and thus the CFP can be set for the wireless LANb, and the same communication based on the obtaining and granting of the transmission opportunity can also be performed. In this case, if the transmission of the user data cannot be normally started in the wireless access point AP, there is a likelihood that an unnecessary CFP will be set for a neighboring wireless device.

When the obtaining and granting of the transmission opportunity through the use of the transmission opportunity-obtaining frame described above is ensured, the wireless access point AP starts to transmit the user data to the wireless user equipment UE. The obtaining of the transmission opportunity can be ensured with the reception of the transmission opportunity-obtaining frame, and the granting of the transmission opportunity can be ensured depending on whether the granting of the transmission opportunity is transferred within the transmission opportunity-obtaining frame or is anew notified with the polling frame or the like from the wireless user equipment UE. Based on a condition that is designated with the UD report, the wireless user equipment UE continues to obtain the transmission opportunity with the transmission opportunity-obtaining frame such as the RTS frame or the polling frame, and continues to receive a signal from the wireless access point AP. With one-time UD report, transmission of a plurality of polling frames is supported, and thus a load on a wireless channel circuit between the wireless base transceiver station BTS and the wireless user equipment UE due to the UD report can be reduced.

A condition for termination of the communication based on the obtaining and granting of the transmission opportunity in the wireless user equipment UE can be described in the UD report, or by adding a new UD report as a control signal at the time of the transmission of the user data, the wireless access point AP can also notify the communication termination, or a change in the frequency with which the transmission opportunity-obtaining frame is transmitted, a transmission timing, an NAV section length, or the like. When normally decoding the user data, the wireless user equipment UE transmits an ACK or a block ACK (hereinafter referred to as BACK) to the wireless access point AP. If information that is the UD report designates the communication based on the successive obtaining and granting of the transmission opportunity, the wireless user equipment UE further continues communication while granting the obtained transmission opportunity to the wireless access point AP. After the communication based on the obtaining and granting of the transmission opportunity in the wireless user equipment UE is terminated, the wireless user equipment UE or the wireless access point AP may notify the wireless base transceiver station BTS that the communication based on the obtaining and granting of the transmission opportunity is terminated in the wireless user equipment UE.

Here, the delay time that it takes for the wireless user equipment UE to obtain the UD report after the UD report is generated is described. If the wireless access point AP generates the UD report, the delay time depends on a type of connection between the wireless access point AP and the wireless base transceiver station BTS. If the wireless access point AP and the wireless base transceiver station BTS are connected directly to each other, it can be expected that the delay time is considerably shortened. On the other hand, as illustrated in (c) of FIG. 2, if the connection is made through the network, a delay on a scale of several ms to seconds is assumed depending on backhaul communication quality, a congestion situation, a gateway connection relationship, and a network situation. Furthermore, even though the UD report is generated by the channel access right communication management unit on the network, a long delay may take place depending on communication quality of the connection to the wireless base transceiver station BTS, the congestion situation, the gateway connection relationship, and the network situation. If the wireless base transceiver station BTS generates the UD report, because the UD report can be transmitted directly to the wireless user equipment UE, an influence of the delay can be decreased to a maximum. If the delay time is long, depending on details of the user data, it may be better not to use the communication based on the obtaining and granting of the transmission opportunity in the wireless user equipment UE that is the receiving node. That is, this is because it is considered that during the delay time that it takes for the UD report to be notified to the wireless user equipment UE, the transfer of the user data due to the communication based on the obtaining and granting of the transmission opportunity by the wireless access point AP is terminated, the transfer of the user data is canceled, or the details of the user data are changed. A condition for deciding the communication based on the obtaining and granting of the transmission opportunity in the wireless user equipment UE that is the receiving node can be decided by the details of the user data, wireless environment information that is measured, or both.

Second Embodiment

Figure 3:
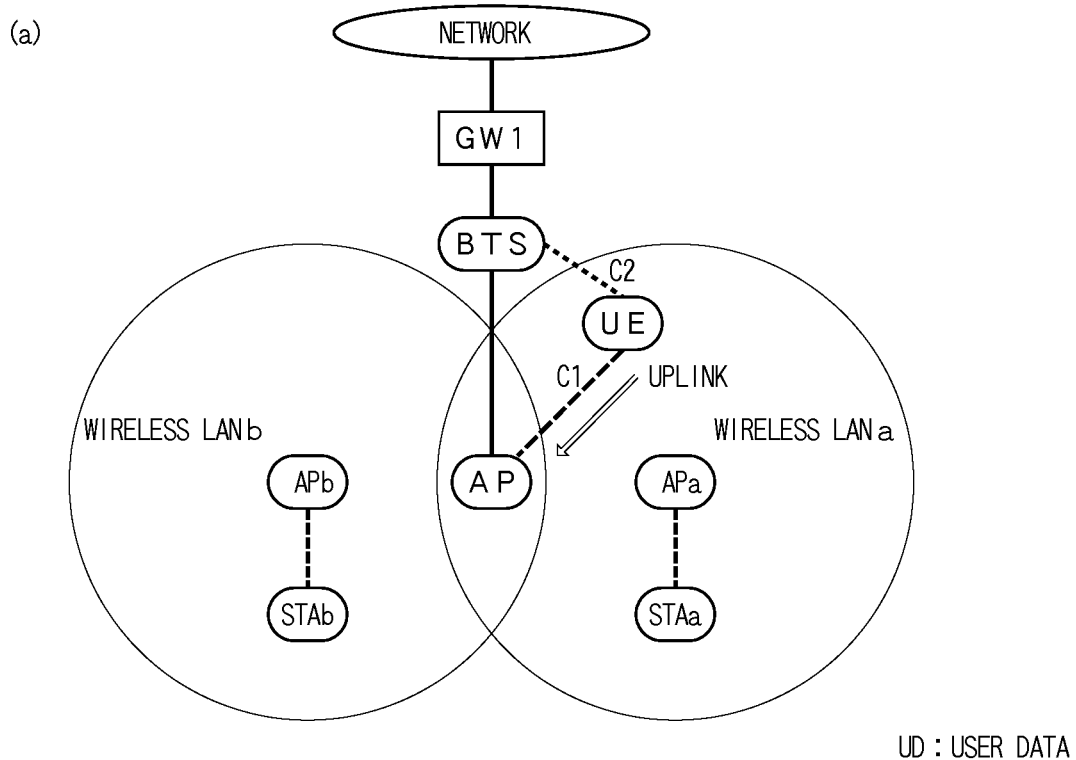
FIG. 3 is a diagram illustrating a user data transmission procedure in uplink communication according to a second embodiment of the present invention.
Figure 3:
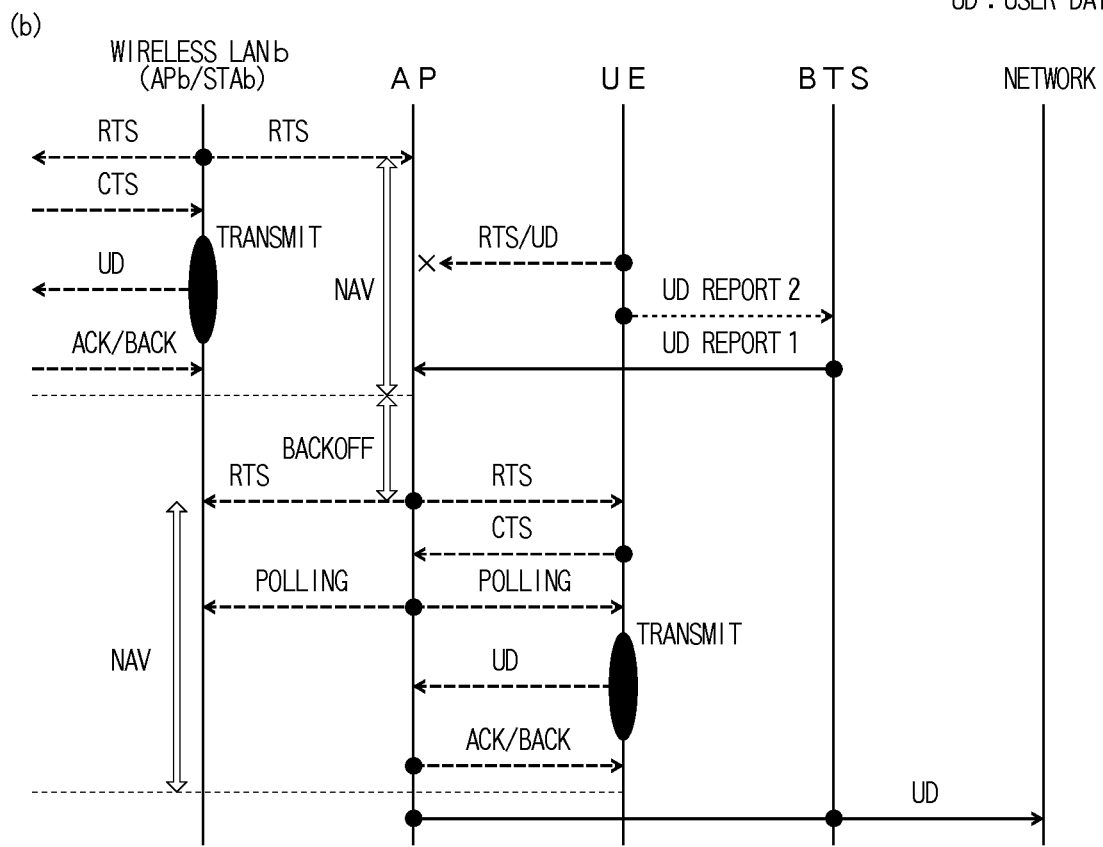

FIG. 3 indicates a user data transmission procedure for the uplink communication according to a second embodiment of the present invention. Here, the transmitting node TX is the wireless user equipment UE, and the receiving node RX is the wireless access point AP.

A difference with the downlink communication that is illustrated in FIG. 1 lies in a situation where a positional relationship between the wireless access point AP and the wireless user equipment UE is reversed in the uplink communication, where when the wireless user equipment UE transmits the user data to the wireless access point AP, the wireless access point AP is influenced by communication over the wireless LANb that is hidden from the wireless user equipment UE, and where throughput of the uplink communication is decreased. The user data is generated in the wireless user equipment UE, is transmitted to the wireless access point AP, and is further transmitted to the network. It is assumed that, as illustrated in (d), (e), and (f) of FIG. 2, because the UD report is generated in the wireless user equipment UE and is transferred to the wireless access point AP, Type 3 is mainly employed, that is, the channel access right communication management unit is one that is included in the wireless user equipment UE. The channel access right communication management units according to Types 1, 2, and 4 can also transfer information relating to a condition to the wireless user equipment UE in view of the condition that will be described below, in such a manner that the wireless user equipment UE can suitably generate the UD report.

The wireless user equipment UE transfers the UD report 2 to the wireless base transceiver station BTS using the channel C2 in the licensed band. The wireless base transceiver station BTS transfers the UD report 1 that corresponds to the received UD report 2, to the wireless access point AP. Here, the time that it takes for the UD report 1, which is transmitted from the wireless base transceiver station BTS, to be input into the wireless access point AP depends on cases that are illustrated in (d), (e), and (f) of FIG. 2, and the case in (f) of FIG. 2, which involves the network, also causes a considerably long delay to take place. According to a type of connection, a situation also takes place in which the UD report cannot be transferred from the wireless base transceiver station BTS to the wireless access point AP. For this reason, a condition for a connection from the wireless base transceiver station BTS to the wireless access point AP is transferred in advance to the wireless user equipment UE, and thus the wireless user equipment UE can also determine in advance whether or not the communication based on the obtaining and granting of the transmission opportunity in the wireless access point AP is possible.

When receiving the UD report 1, the wireless access point AP recognizes that the communication based on the obtaining and granting of the transmission opportunity necessary for the uplink communication by the wireless user equipment UE needs to be supported, and as is the case with the downlink communication, starts processing for the obtaining and granting of the transmission opportunity. When with the random access control, the wireless LANb is not in communication, if the transmission opportunity-obtaining frame is transmitted, the NAV is set for the wireless LANb, and it is possible that the wireless access point AP normally receives the user data from the wireless user equipment UE. In the uplink communication as well as in the downlink communication, the wireless user equipment UE continues the communication based on the obtaining and granting of the transmission opportunity in the wireless access point AP until a termination condition is satisfied according to the UD report. The user data is input from the wireless access point AP to the network. At this time, the wireless base transceiver station BTS may be involved and may not be involved. After the communication based on the obtaining and granting of the transmission opportunity in the wireless access point AP is terminated, the wireless user equipment UE or the wireless access point AP may notify the wireless base transceiver station BTS that the communication based on the obtaining and granting of the transmission opportunity is terminated.

Third Embodiment

The communication based on the obtaining and granting of the transmission opportunity in the receiving node according to the present invention can find application in multi-user simultaneous transmission and reception. The multi-user simultaneous transmission and reception, for example, may be communication that uses spatial multiplexing based on the multi-user MIMO technology. For the multi-user simultaneous transmission and reception, frequency multiplexing in which multiple users are multiplexed by allocating a frequency band based on the OFDMA technology to a plurality of users in a non-overlapping manner, code multiplexing in which multiplexing is performed with orthogonal codes, or both may be used.

Figure 4:
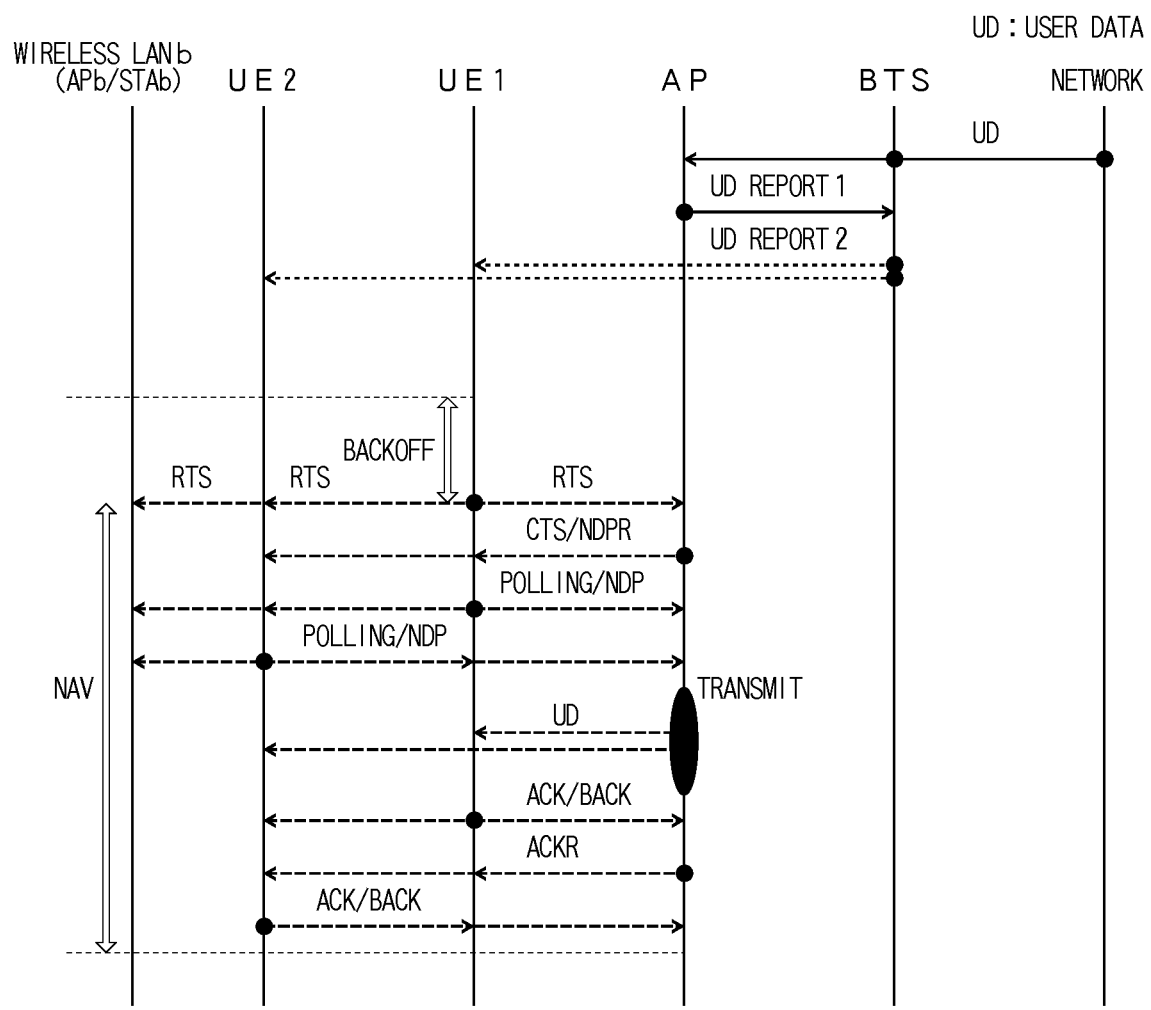
FIG. 4 is a diagram illustrating a user data transmission procedure in downlink communication according to a third embodiment of the present invention.

FIG. 4 indicates a user data transmission procedure for downlink communication according to a third embodiment of the present invention. Here, the multi-user simultaneous communication in the downlink communication is described, taking as an example the transmission from the wireless access point AP to wireless user equipments UE1 and UE2.

In FIG. 4, with the UD report 2, the information relating to the transmission-waiting user data in the wireless access point AP is transferred from the wireless base transceiver station BTS to the wireless user equipments UE1 and UE2. When obtaining the UD report 2, the wireless user equipments UE1 and UE2 perform control of the obtaining and granting of the transmission opportunity based on a rule for random access. Transmission and reception of the RTS frame, the CTS frame, and the polling frame are the same in the first embodiment. Furthermore, in the same manner as in the first embodiment, if the wireless base transceiver station BTS performs generating of the UD report, the UD report 1 can be omitted, and if the UD report is generated in the channel access right communication management unit on the network, the UD report 1 is transferred from the network to the wireless base transceiver station BTS.

If the spatial multiplexing is performed, because information on a channel between the wireless access point AP and each of the wireless user equipments UE1 and UE2 is necessary, the wireless access point AP can be caused to estimate channel information on the uplink, by transmitting the NDP. Here, the NDPR may be transmitted before the NDP. In an example in FIG. 4, to acknowledge the reception of the RTS frame that is transmitted by the wireless user equipment UE1, the CTS that has NDPR functionality is transmitted, and the wireless user equipment UE1 and the wireless user equipment UE2 transmit the NDP. Furthermore, the wireless user equipment UE1 and the wireless user equipment UE2 successively transmit the NDP, but the wireless user equipment UE2 may also be caused to individually transmit the NDPR and to transmit the NDP. Furthermore, although there are present three or more wireless user equipments UE that want to perform multi-user simultaneous transmission over the downlink, each can also be caused to transmit the NDP. Also in multi-user transmission in the spatial multiplexing, because in some cases, the channel information that was estimated in the past can also be used, the transmission of the NDP is not necessarily indispensable. In FIG. 4, the transmission of the NDPR and the NDP can also be performed after the exchange of the RTS/CTS and the granting of the transmission opportunity in the polling frame. In this case, the following order can be intended: RTS transmission by the UE1→CTS transmission by the AP→polling transmission by the UE1→the NDPR transmission by the AP→NDP transmission by the UE1→NDPR transmission by the AP→NDP transmission by the UE2→data frame transmission. If a condition for the spatial multiplexing holds, the wireless access point AP performs the multi-user simultaneous transmission to the wireless user equipments UE1 and the UE2, obtains the ACK or the BACK, and thus can ensure normal transfer of the user data. In FIG. 4, after the ACK/BACK is received from the wireless user equipment UE1, an ACK request (hereinafter referred to as ACKR) is made to the wireless user equipment UE2 to collect the ACK. However, after the normal transmission of the user data through the use of a data frame, with the transmission of the scheduled ACK/BACK, the ACK/BACK may be received successively from the wireless user equipments UE1 and UE2.

If frequency division multiplexing or code multiplexing is performed, after the obtaining and granting of the transmission opportunity, the wireless user equipments UE1 and UE2 perform downlink transmission that uses the frequency division multiplexing or the code multiplexing. On this occasion, before the transmission of the user data, a frequency channel or code allocation may be notified. In the multi-user simultaneous communication based on the obtaining and granting of the transmission opportunity, the wireless user equipments UE1 and UE2 that perform reception are all in a state of being available for communication and are required not to be the hidden terminal. However, the wireless user equipments UE1 and UE2 can be caused to perform the obtaining and granting of the transmission opportunity, and thus to start the multi-user simultaneous transmission, using as a reference the wireless station that is at least not the user equipment in a hidden terminal state. Accordingly, the frequency with which the multi-user simultaneous transmission that has high transmission efficiency is used can be increased.

Fourth Embodiment

Figure 5:
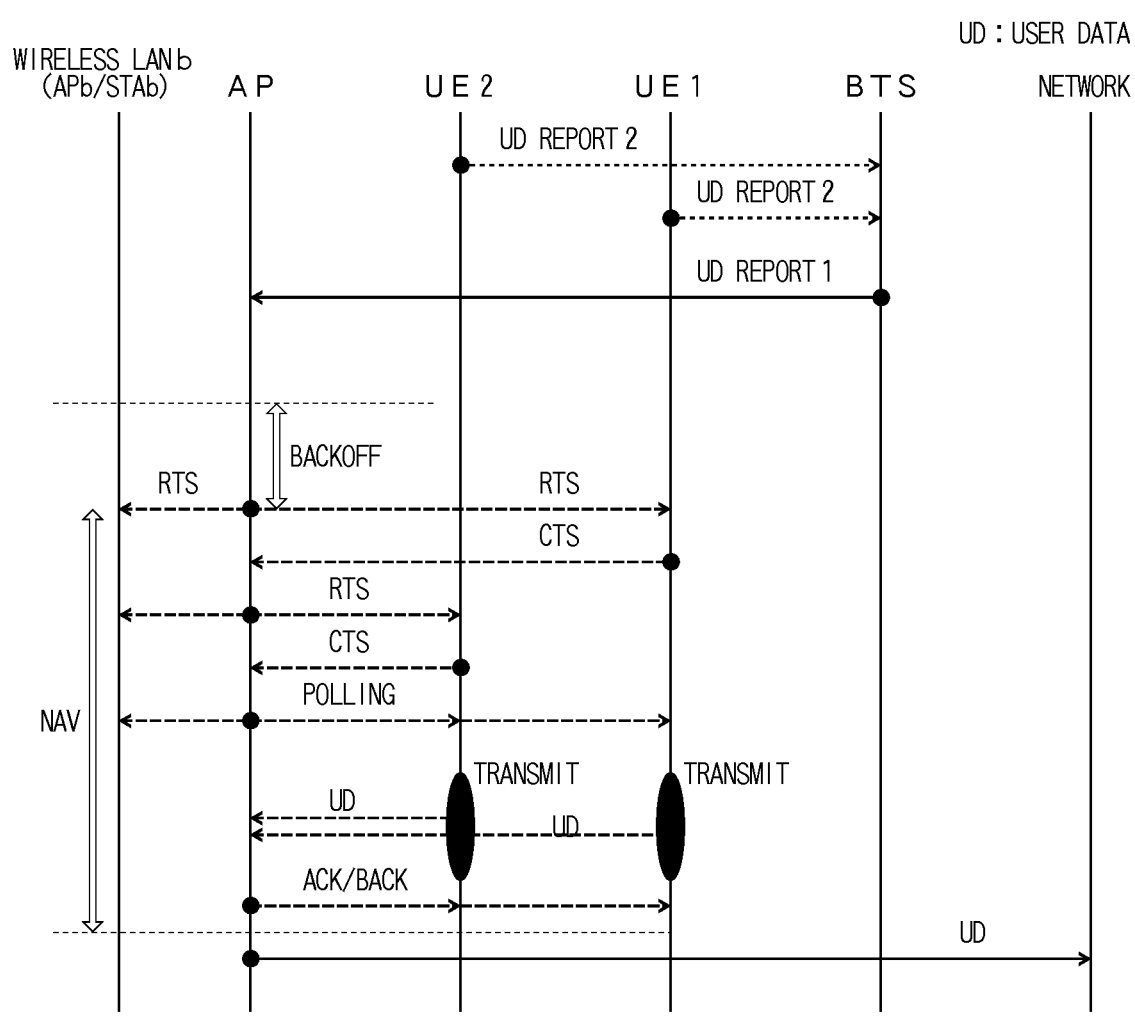
FIG. 5 is a diagram illustrating a user data transmission procedure in uplink communication according to a fourth embodiment of the present invention.

FIG. 5 indicates a user data transmission procedure for uplink communication according to a fourth embodiment of the present invention. Here, the multi-user simultaneous communication in the uplink communication is described, taking as an example the transmission from the wireless user equipments UE1 and UE2 to the wireless access point AP.

In FIG. 5, the wireless user equipments UE1 and UE2 transfer pieces of information relating to the transmission-waiting user data, as the UD reports 2, to the wireless base transceiver station BTS. The wireless base transceiver station BTS transfers these pieces of information, as the UD reports 1, to the wireless access point AP. In FIG. 5, an example is illustrated in which the UD reports 2 of the wireless user equipments UE1 and UE2 are arranged into one UD report 1 and the one UD report 1 is output, but the UD reports 2 may be separately sent. The wireless access point AP decides that the user data is simultaneously received, from the UD reports 1 of the wireless user equipments UE1 and UE2 that are communication partners. For the obtaining and granting of the transmission opportunity, the wireless access point AP transmits and receives the RTS frame and the CTS frame between the wireless access point AP itself and the wireless user equipment UE1, successively transmits and receives the RTS frame and the CTS frame between the wireless access point AP itself and the wireless user equipment UE2, and sets the NAV for the wireless LANb. In FIG. 5, the exchange of the RTS/CTS between each of the wireless stations is performed. However, the RTS frame that is common to a plurality of wireless user equipments UE may be transmitted, and the CTS frame may be caused to be transmitted in the scheduled order from each of the plurality of wireless user equipments UE. Thereafter, the polling frame is transmitted to the wireless user equipments UE1 and UE2, the transmission opportunity that is obtained by the wireless access point AP is granted, and the wireless user equipments UE1 and UE2 are instructed to perform the simultaneous transmission. At this time, a signal for improving the precision of the transmission timing or of frequency synchronization for the wireless user equipments UE1 and UE2 may be transmitted. When the reception from the wireless user equipments UE1 and UE2 is finished, the communication is terminated with the transmission of the ACK or the BACK.

If it can be determined that the successive transmission-waiting user data is present in the wireless user equipments UE1 and UE2, the wireless access point AP continues to perform the communication based on the obtaining and granting of the transmission opportunity, without receiving a new UD report. On this occasion, the successive multi-user simultaneous transmission may be performed, the multi-user simultaneous transmission in which a combination of wireless stations is changed may be performed, and a single wireless station may be requested to perform the communication based on the obtaining and granting of the transmission opportunity.

The performing of the multi-user simultaneous communication according to the present invention in the uplink communication has a merit in that information of the transmission-waiting user data in a plurality of wireless user equipments UE can be collected over the channel C2 in the licensed band. When the information is collected over the channel C1 in the unlicensed band, there is a likelihood that preprocessing for realizing the multi-user simultaneous transmission over the uplink will create high overhead depending on a neighboring wireless environment on the channel C1. Sharing of the transmission-waiting information between each of the wireless user equipments UE1 and UE2 that use the licensed band and the wireless base transceiver station BTS is in advance caused to be terminated, and thus an amount of handshaking signal necessary in the unlicensed band can be reduced and a success rate of the multi-user simultaneous communication can be increased.

Figure 6:
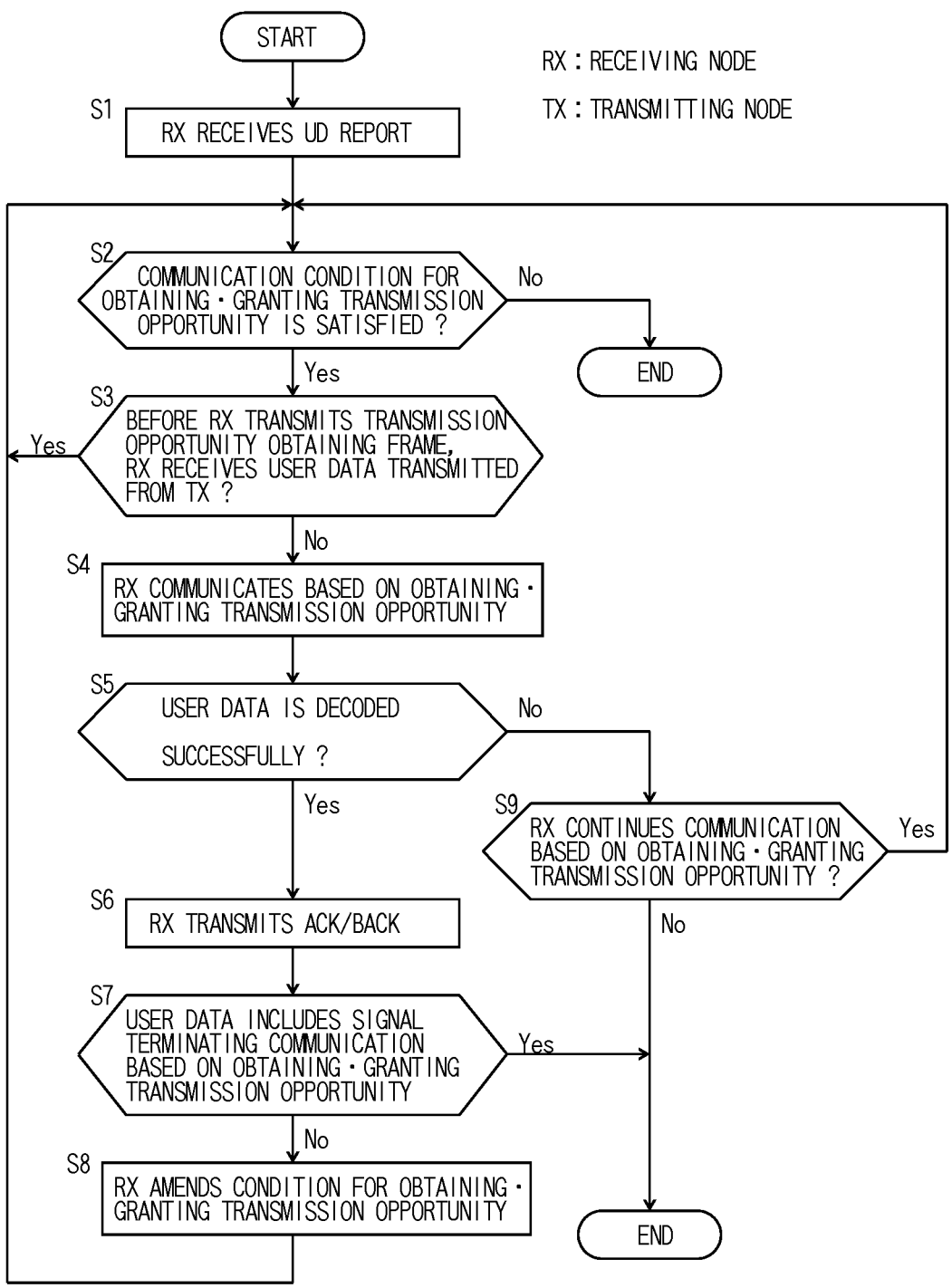
FIG. 6 is a flowchart illustrating a procedure for processing by a wireless user equipment UE or by a wireless access point AP, which is a receiving node in the wireless communication system according to the present invention.

FIG. 6 illustrates a procedure for processing by the wireless user equipment UE on the downlink or by the wireless access point AP on the uplink, which is the receiving node of the wireless communication system according to the present invention.

In FIG. 6, the wireless user equipment UE on the downlink receives the UD report of the wireless access point AP through the channel C2 in the licensed band, from the wireless base transceiver station BTS (Step S1). Alternatively, the wireless access point AP on the uplink receives the UD report of the wireless user equipment UE through a backhaul circuit, from the wireless base transceiver station BTS (Step S1). The UD report has information relating to the transmission-waiting user data. The UD report, for example, can designate a total amount of user data that waits for transmission, a total amount of user data that has to be transmitted with the communication based on the obtaining and granting of the transmission opportunity in the receiving node, throughput that is required of the communication based on the obtaining and granting of the transmission opportunity in the receiving node, the frequency with which the random access is performed with the communication based on the obtaining and granting of the transmission opportunity in the receiving node, throughput that is required of the communication based on the obtaining and granting of the transmission opportunity in the transmitting node and the transmission opportunity in the receiving node, the number of times that the access right is obtained with the communication based on the obtaining and granting of the transmission opportunity in the receiving node, a timing at which the communication based on the obtaining and granting of the transmission opportunity in the receiving node is performed, and a condition for terminating the communication based on the obtaining and granting of the transmission opportunity in the receiving node.

Additionally, the UD report can also notify a method of the communication based on the obtaining and granting of the transmission opportunity in the receiving node, a type of frame, for example, such as the RTS, the CTS, the NDP, the NDPR, or the polling frame, as the transmission opportunity-obtaining frame that is transmitted, a time length of the NAV that is set, an access category of the user data, and the like, in a combined manner. However, when the communication based on the obtaining and granting of the transmission opportunity in the receiving node according to the present invention is started in advance without these parameters being designated with the UD report, a value that is selected as an initial value can also be decided. This is because when the communication with the wireless access point AP or the wireless user equipment UE succeeds as will be described below, an amendment or a change can also be made by a signal from the wireless access point AP or the wireless user equipment UE. If the frequency with which the random access is performed with the communication based on the obtaining and granting of the transmission opportunity in the receiving node is designated, a time interval is designated in such a manner that participation in the random access takes place one time at T [ms], or if the receiving node also retains the user data that wants to be transmitted to the transmitting node, an obtaining ratio at which the transmission opportunity is obtained in each case is set, and thus the frequency with which the communication based on the obtaining and granting of the transmission opportunity in the receiving node is performed can be controlled.

With the UD report, it is determined whether or not the communication based on the obtaining and granting of the transmission opportunity in the receiving node is designated, or whether or not a communication condition for the obtaining and granting of the transmission opportunity is satisfied (Step S2). If the condition is satisfied, because the transmission opportunity-obtaining frame is transmitted in the unlicensed band, an attempt is made to perform transmission according to the rule for the random access that is decided in the unlicensed band. In the random access, if a contention window size is decided with the access category of the user data, access category information of the user data that is indicated with the UD report can be used, the access category that is in advance decided for the obtaining and granting of the transmission opportunity in the receiving node can be used, or the access category of the user data that the receiving node, which will be described below, transmits using the transmission opportunity can be used.

Before the receiving node transmits the transmission opportunity-obtaining frame, when the user data can be transmitted from the transmitting node that is the wireless user equipment UE on the uplink or that is the wireless access point AP on the downlink and can be normally decoded (Yes in Step S3), it is determined again in Step S2 whether the condition for the communication based on the obtaining and granting of the transmission opportunity in the receiving node is satisfied. This is because the communication based on the transmitting node obtaining the transmission opportunity is also influenced by the condition for the communication based on the obtaining and granting of the transmission opportunity in the receiving node. For example, in the example described above, if the total amount of user data that waits for transmission in the transmitting node is designated, the information of the transmission-waiting user data can be updated by subtracting an amount of user data that is already transmitted with the communication based on the transmission opportunity and so on, and it can be ensured that the transmission-waiting user data is still present. If throughput that is required of the communication based on both of the transmitting node and the receiving node obtaining the transmission opportunity is designated with the UD report, when a requirement condition is not reached in view of throughput that occurs to the obtaining of the transmission opportunity in the transmitting node, from a result of decoding of reception data based on the transmission opportunity of the transmitting node, it can be determined that the communication based on the obtaining and granting of the transmission opportunity in the receiving node continues to be performed. If the communication by the transmitting node, based on the transmission opportunity, does not have an influence on the determination of whether or not to perform the communication based on the obtaining and granting of the transmission opportunity in the receiving node, Step S3 may not be performed.

If there is no reception of the user data based on the transmission opportunity and a result of the determination in Step S3 is No, or if Step S3 is not performed, the communication based on the obtaining and granting of the transmission opportunity in the receiving node is performed (Step S4). If requested throughput of the communication based on the obtaining and granting of the transmission opportunity, or the frequency with which the communication based on the obtaining and granting of the transmission opportunity is designated with the UD report, the obtaining and granting of the transmission opportunity, based on the random access, can also be performed with necessary frequency. When the obtaining and granting of the transmission opportunity is performed in the receiving node, necessary user data is transmitted from the transmitting node and it is determined whether or not the necessary user data can be normally decoded (Step S5). If the normal decoding can be performed and a result of the determination in Step S5 is Yes, the transmission of the ACK or the BACK is performed (Step S6), and it is checked whether or not a signal that causes the communication, based on the obtaining and granting of the transmission opportunity in the receiving node, to be terminated is included in the user data (Step S7). If it is known in advance that the signal which causes the communication, based on the obtaining and granting of the transmission opportunity in the receiving node, to be terminated is not added to the user data, Step S7 may be omitted. If the termination of the communication based on the obtaining and granting of the transmission opportunity in the receiving node is designated and a result of the determination in Step S7 is Yes, the communication based on the obtaining and granting of the transmission opportunity in the receiving node is terminated.

If the termination of the communication based on the obtaining and granting of the transmission opportunity in the receiving node is not designated and the result of the determination in Step S7 is No, or if Step S7 is not performed, when an amendment to the condition for the obtaining and granting of the transmission opportunity in the receiving node is designated with the user data, or when it is decided in advance that the amendment to the condition is made whenever the reception of the user data based on the obtaining and granting of the transmission opportunity succeeds, the amendment to the condition for the obtaining and granting of the transmission opportunity in the receiving node is made (Step S8), and returning to Step S2 takes place. Here, the conditions for the obtaining and granting of the transmission opportunity in the receiving node, there are the frequency with which the participation in the random access takes place, a time length that designates the NAV, identification information that designates the NAV, a transmission destination for communication, the frequency with which the communication based on the obtaining and granting of the transmission opportunity in the receiving node is performed, a condition for the termination of the communication based on the obtaining and granting of the transmission opportunity in the receiving node, a condition for the multi-user simultaneous communication that is designated with the transmission opportunity-obtaining frame, the access category of the user data, and the like. Furthermore, a change may be made using a rule that is decided in advance, such as gradually increasing the time length of the NAC each time the communication based on the obtaining and granting of the transmission opportunity in the receiving node succeeds, or causing the retuning to an initial value to take place when a failure takes place.

If the user data cannot be normally decoded and the result of the determination in Step S5 is No, it is determined whether or not the communication based on the obtaining and granting of the transmission opportunity in the receiving node continues to be performed (Step S9), and if so, returning to Step S2 takes place. As this determination reference, the condition for the termination of the communication based on the obtaining and granting of the transmission opportunity can be designated with the UD report, and a rate of or the number of times of failure of the transmission opportunity-obtaining frame, a packet error rate of the data frame based on the obtaining and granting of the transmission opportunity, a rate of or the number of times of failure in the decoding of the user data based on the obtaining and granting of the transmission opportunity, and a parameter that can be acquired with the communication based on the transmission opportunity. These may be designated with information that is given to the UD report or the user data. When it comes to a comparison of the communications based on the transmission opportunity of the transmitting node, a rate of failure in the communication based on the obtaining of the transmission opportunity, the number of times of the failure in the communication based on the obtaining of the transmission opportunity, the number of times of the obtaining of the transmission opportunity, a rate of the obtaining of the transmission opportunity, and throughput of the communication based on the obtaining of the transmission opportunity, are compared with those based on the obtaining and granting of the transmission opportunity in the receiving node, and if the result is equal to or larger or is equal to or smaller than a multiple that is decided in advance or a value that is decided in advance is reached, the communication based on the obtaining and granting of the transmission opportunity in the receiving node can be terminated. When this step is performed, if an effect of the communication based on the obtaining and granting of the transmission opportunity in the receiving node is small, a load on the receiving node can be reduced.

Fifth Embodiment

The flow for performing the communication from the transmitting node, based on the obtaining and granting of the transmission opportunity in the receiving node, has been described so far, but although the receiving node is also a transmitting and receiving node that has the user data which is transmitted to the transmitting node, both of the transmission and the reception can be performed in the transmission prohibition section for a neighboring wireless station that is set to obtain the transmission opportunity.

Figure 7:
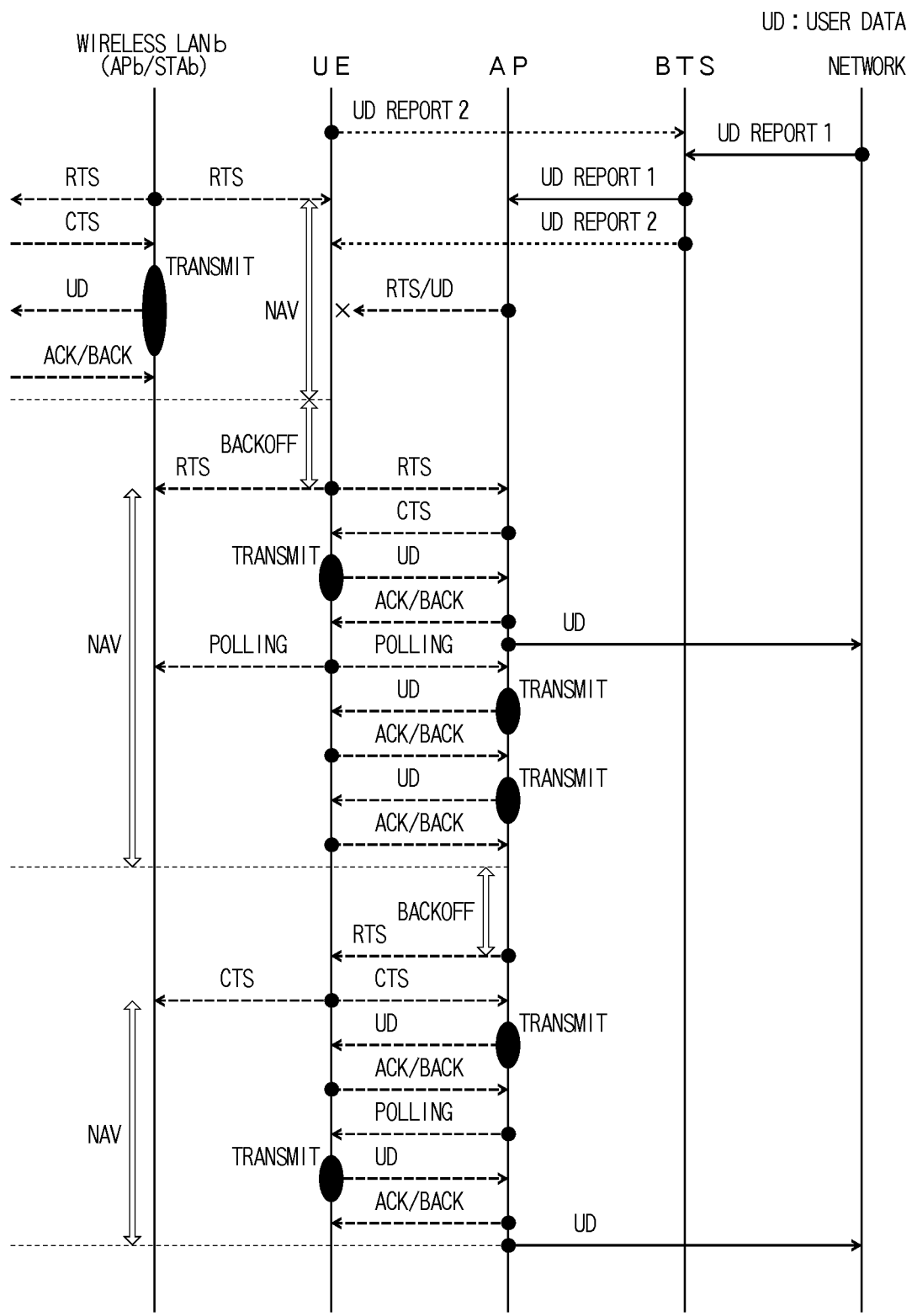
FIG. 7 is a diagram illustrating a user data transmission procedure in uplink/downlink communication according to a fifth embodiment of the present invention.

FIG. 7 illustrates a user data transmission procedure in uplink or downlink communication according to the fifth embodiment of the present invention. Here, an example is described in which communication from the wireless user equipment UE to the wireless access point AP, as the uplink communication, and communication from the wireless access point AP to the wireless user equipment UE, as the downlink communication, occurs simultaneously, and in which the UD report is transferred to both of the wireless user equipment UE and the wireless access point AP.

In the uplink, the UD report 2 is transmitted from the wireless user equipment UE to the wireless base transceiver station BTS, and is output, as the UD report 1, to the wireless access point AP. On the other hand, an example is described in which the UD report over the downlink is generated in the channel access right communication management unit on the network. When it is decided that the user data is transmitted through the wireless access point AP, the UD report 1 is output from the network to the wireless base transceiver station BTS and is transmitted, as the UD report 2, from the wireless base transceiver station BTS to the wireless user equipment UE. In this situation, because the wireless user equipment UE and the wireless access point AP both has the transmission-waiting user data, a ratio between transmission and reception is decided for the transmission prohibition section that is set for a neighboring wireless station after each obtains the transmission opportunity.

In FIG. 7, after obtaining the UD report 2, the wireless user equipment UE exchanges the RTS/CTS, obtains the transmission opportunity, and transmits the user data. The wireless access point AP receives the user data, transmits the ACK, and further transmits the user data to the network. Because with the UD report 2, the wireless user equipment UE knows that the transmission-waiting user data is present also in the wireless access point AP, transmits the polling frame to the wireless access point AP after the termination of the transmission, and grants the transmission opportunity. It is noted that, in the first embodiment that is illustrated in FIG. 1, when it comes to the transmission opportunity that is obtained, according to the UD report 2, by the wireless user equipment UE, the wireless user equipment UE transmits the polling frame to the wireless access point AP without transmitting the user data, and thus grants the transmission opportunity. The wireless access point AP forms a data frame, using the user data, the termination of the communication with which is possible within the transmission prohibition section, and transmits the formed data frame to the wireless user equipment UE. In FIG. 7, the transmission of the data frame is performed two times, and the ACK is obtained each time. In this manner, a plurality of data frames can be transmitted or received within the transmission prohibition section.

When the transmission prohibition section is finished, the wireless access point AP exchanges the RTS/CTS and thus obtains the transmission opportunity. The data frame over the downlink is transmitted and the ACK is obtained, and then it is decided that the remaining time is used for reception. After the transmission over the downlink is terminated, the transmission opportunity is granted, with the polling frame, to the wireless user equipment UE, and the wireless user equipment UE is requested to transmit the user data over the uplink. The wireless user equipment UE generates and transmits the data frame, the termination of the communication with which is possible within the transmission prohibition section.

If the transmission opportunity is obtained in such a manner that the transmission and the reception both are performed, the time length of the NAV can be selected by adding the time that is divided in advance, to the time necessary for the transmission, such as setting the NAV to, for example, the maximum length that can be selected. If the transmission and reception of the user data is terminated at an earlier time than the termination time of the transmission prohibition section that is set with the NAV, a signal that anew designates reduction or cancellation of the transmission prohibition section, such as adding the signal that designates the reduction or cancellation of the transmission prohibition section to a signal that is exchanged within the transmission prohibition section that is obtained with the transmission opportunity by the wireless user equipment UE and the wireless access point AP.

Next, a condition for starting the communication, based on the obtaining and granting of the transmission opportunity in the receiving node, in the channel access right communication management unit is described. The communication based on the obtaining and granting of the transmission opportunity in the receiving node, of which the use can be determined with (1) wireless environment information, (2) traffic information, (3) a configuration of a network between the wireless access point AP and the wireless base transceiver station BTS, and (4) a user grade, can be used for determination whether or not to generate the UD report 1, determination of whether or not to generate the UD report 2, and determination of whether or not to start the communication based on the obtaining and granting of the transmission opportunity in the receiving node, based on the UD report 1 or the UD report 2 that is received. The following four conditions are described.

(1) Wireless Environment Information

Channel utilization that is measured between the wireless access point AP and the wireless user equipment UE, the number of wireless stations in communication, and an ID of the wireless station in communication are measured and it is determined whether or not the communication based on the obtaining and granting of the transmission opportunity in the receiving node is performed. The channel utilization p is a parameter that is expressed as a ratio of a carrier sense time Tc to a certain time section T, that is, $\rho=Tc/T$. If the channel utilization in the wireless access point AP, as the transmitting node, for example, in the downlink communication is lower, the wireless user equipment UE, as the receiving node, for example, in the downlink communication, is caused to obtain the transmission opportunity, and if the channel utilization in the receiving node is low, the transmitting node is caused to obtain the transmission opportunity. Thus, an improvement in throughput can be expected.

If the number of wireless user equipments UE that has access to the wireless access point AP is great, the wireless user equipment UE is caused to obtain the transmission opportunity, and thus the number of persons who obtains the transmission opportunity can be increased and a ratio at which a wireless resource in a channel in the primary frequency band is utilized can be increased. Furthermore, a comparison of ID's of the wireless stations that are observed in the wireless access point AP and the wireless user equipment UE can determine which one is influenced by the communication by the hidden terminal and can determine the obtaining of the transmission opportunity in the receiving node. Additionally, it can be determined whether or not communication quality in the primary frequency band actually evaluated is evaluated and the communication based on the obtaining and granting of the transmission opportunity in the receiving node is used. In the wireless access point AP or the wireless user equipment UE, as the receiving node, a case is designated where a condition for failure of the communication based on the obtaining and granting of the transmission opportunity exceeds a certain threshold. As the failure condition, the contention window size, a Packet Error Rate (PER), failure on communication that is thought to be due to packet collision, throughput that results when a communication partner obtains the transmission opportunity, or a difference in or a ratio for the frequency with which the transmission opportunity is obtained can be intended. A case where the measured result is unstable may be a termination condition. Additionally, the measured wireless environment information is stored associated with the time, the date, the day, external event information, such as operation information on public transportation, and positional information on the wireless user equipment UE, and thus the time for which the communication based on the obtaining and granting of the transmission opportunity is used, a location of the wireless user equipment UE, and the number of or distribution of wireless user equipments UE can be decided. Furthermore, the communication based on the obtaining and granting of the transmission opportunity may be used between the wireless base transceiver station BTS and the wireless user equipment UE of which communication quality is determined as being poor. If a plurality of wireless user equipments UE are caused to perform the communication based on the obtaining and granting of the transmission opportunity, it can be determined whether or not detection of them is mutually possible with the primary frequency band, and the wireless user equipment UE that causes the communication, based on the obtaining and granting of the transmission opportunity, to be performed in such a manner that the number of wireless user equipments UE which cannot be mutually detected is decreased can be decided.

(2) Traffic Information

The communication based on the obtaining and granting of the transmission opportunity in the receiving node can be caused to be performed in a traffic situation of the wireless base transceiver station BTS in the secondary frequency band and in a traffic situation of the wireless access point AP in the primary frequency band. When the wireless resource is temporally in short supply, it is easy for a hidden terminal problem to occur in the primary frequency band, or an amount of distribution of the user data that is allocated to a second wireless base transceiver station BTS is increased, thereby decreasing throughput per user. Thus, the use of the wireless access point AP that utilizes the communication based on the obtaining and granting of the transmission opportunity in the receiving node can be determined.

(3) Configuration of a Network between the Wireless Access Point AP and the Wireless Base Transceiver Station BTS The channel access right communication management unit that manages the communication based on the obtaining and granting of the transmission opportunity in the receiving node stores a connection condition, such as a delay time in the communication between the wireless access point AP and the wireless base transceiver station BTS, and it can be determined whether or not the communication based on the obtaining and granting of the transmission opportunity in the receiving node is performed. If the type of connection is a type of connection in which the UD report cannot be transferred to the wireless access point AP, it can be determined that the communication based on the obtaining and granting of the transmission opportunity in the receiving node is not performed. From the delay time in the communication between the wireless access point AP and the wireless base transceiver station BTS, with the access category of the user data or a type of application, it may be determined whether or not the communication based on the obtaining and granting of the transmission opportunity in the receiving node is performed. Furthermore, with an application which is such that generation of the user data cannot be predicted from the receiving node, the communication based on the obtaining and granting of the transmission opportunity in the receiving node cannot also be used. Conversely, the communication based on the obtaining and granting of the transmission opportunity in the receiving node may be utilized for an application which is such that the generation of the user data in a stationary transmitting node can be predicted, for example, an application that continuously transfers user data for telephone conversation, TV telephone conversation, on-line gaming, audio and moving-image viewing, and the like, on a time scale of seconds. Furthermore, it can be determined in advance whether or not the delay time in the communication between the wireless access point AP and the wireless base transceiver station BTS satisfies the delay time that is requested by the user data, and it can also be decided whether or not the communication based on the obtaining and granting of the transmission opportunity in the receiving node is utilized. For example, as illustrated in (a) of FIG. 2, if delay in the configuration of the network between the wireless access point AP and the wireless base transceiver station BTS is satisfactory, such as being considerably low, it can also be determined that the communication based on the obtaining and granting of the transmission opportunity in the wireless user equipment UE is always performed in the wireless access point AP, and so on.

(4) User Grade

Because control, such as the transfer of the UD report, is necessary in order to perform the communication based on the obtaining and granting of the transmission opportunity in the wireless user equipment UE, with a type of contract by a user who has the wireless user equipment UE, or a function of the wireless user equipment UE, it can also be set whether or not the communication based on the obtaining and granting of the transmission opportunity.

Sixth Embodiment

Figure 8:
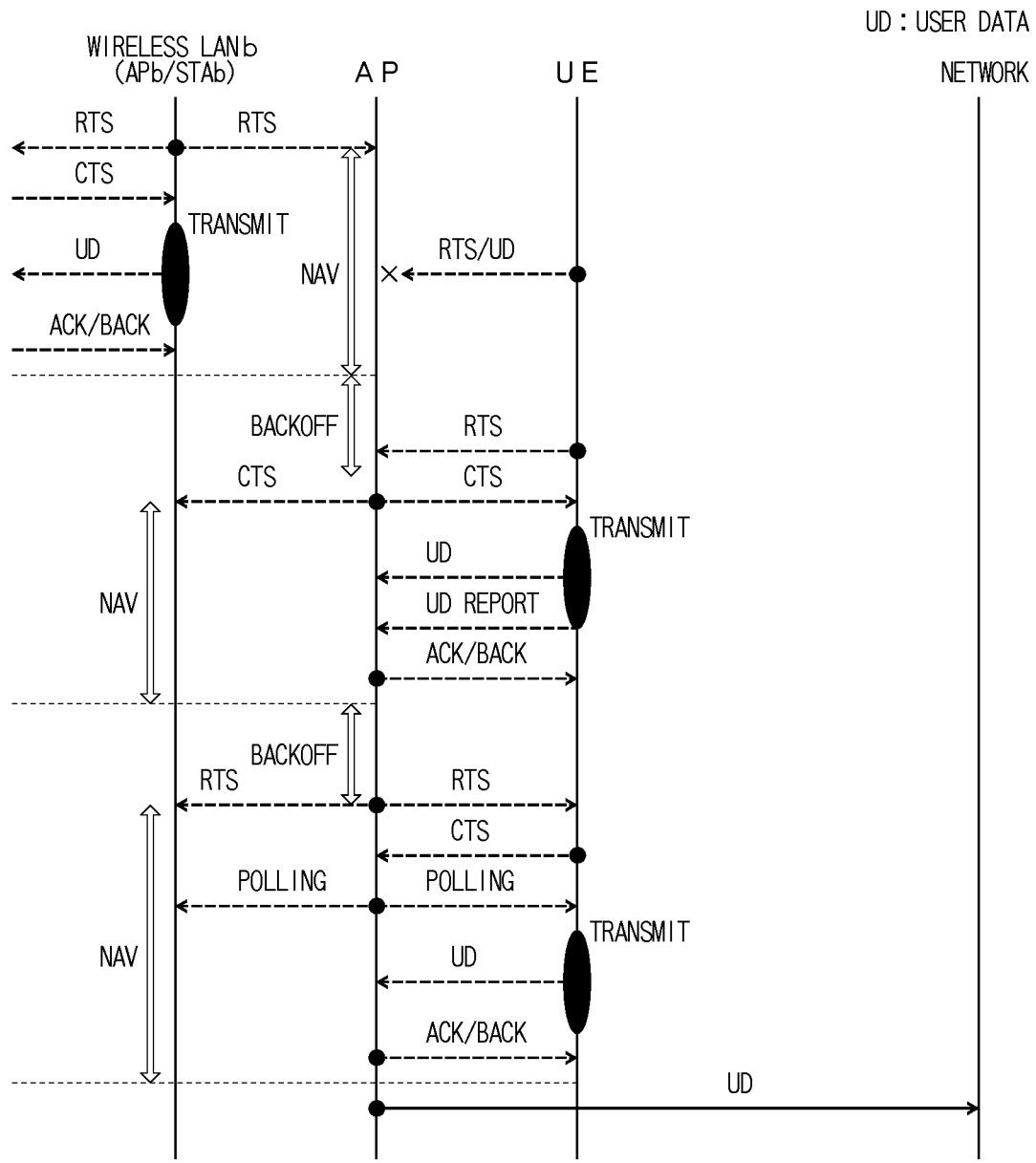
FIG. 8 is a diagram illustrating a user data transmission procedure in uplink communication according to a sixth embodiment of the present invention.

A procedure in which the communication based on the obtaining and granting of the transmission opportunity in the receiving node is intended to be possible without the wireless base transceiver station BTS that uses the channel C2 in the licensed band, using the method described above in which the information indicating the communication based on the obtaining and granting of the transmission opportunity in the receiving node is added to the user data is described with reference to FIG. 8.

In FIG. 8, the transmission of the user data in the communication, as the uplink communication, from the wireless user equipment UE to the wireless access point AP, is described as an example, but the same is true although the direction of the transmission between the wireless user equipment UE and the wireless access point AP is reversed and thus the transmission of the user data in the communication, as the downlink communication, from the wireless access point AP to the wireless user equipment UE is performed.

If the communication does not need the wireless base transceiver station BTS, the UD report is transmitted to the wireless access point AP, in a state of being included in the user data, using the transmission opportunity that is obtained by the wireless user equipment UE. As illustrated in FIG. 8, when the wireless user equipment UE succeeds in the transmission to the wireless access point AP, the UD report is inserted into the user data, and the UD report is caused to be obtained on the channel C1 by the wireless access point AP. Based on the obtained UD report, the wireless access point AP can perform a flow that is illustrated in FIG. 6, and can perform the communication based on the obtaining and granting of the transmission opportunity in the receiving node.

(Example of a Configuration of the Wireless Access Point AP)

FIG. 9 illustrates an example of a configuration of the wireless access point AP.

In FIG. 9, the wireless access point AP includes a C1 antenna 11 that is for a channel in the unlicensed band, a C1 transmission and reception unit 12 that demodulates a reception signal which is received on the channel C1 and performs conversion to digital data, synchronization, decoding, and transmission, that performs modulation of a user data signal, addition of a control signal, and conversion to an analog signal at a carrier frequency on the channel C1, and that performs transmission based on the rule for the random access in the unlicensed band, a device control unit 13 that manages an entire device, such as performing control of the user data, a network communication unit 14 that performs input and output into and to the network, the transmission opportunity control unit 15 that, as the transmitting node or the receiving node, controls the obtaining of the transmission opportunity on the channel C1, and a storage unit 16 in which the transmission-waiting user data is stored.

(Example of a Configuration of the Wireless Base Transceiver Station BTS)

FIG. 10 illustrates an example of a configuration of the wireless base transceiver station BTS.

In FIG. 10, the wireless base transceiver station BTS includes a C2 antenna 21 that is for a channel in the licensed band, a C2 transmission and reception unit 22 that demodulates a reception signal which is received on the channel C2 and performs conversion to digital data, synchronization, decoding, and transmission, that performs modulation of a user data signal, addition of a control signal, and conversion to an analog signal at a carrier frequency on the channel C2, and that performs transmission based on a rule for the transmission in the licensed band, a device control unit 23 that manages an entire device, such as performing control of the user data, a network communication unit 24 that performs input and output into and to the network, the user data information management unit 25 that manages information relating to the transmission-waiting user data of the wireless access point AP, the wireless user equipment UE, or both, in order to make possible the communication based on the obtaining of the transmission opportunity in the transmitting node or the receiving node on the channel C1, and a storage unit 26 in which the user data or control data is stored.

(Example of a Configuration of the Wireless User Equipment UE)

FIG. 11 illustrates an example of a configuration of the wireless user equipment UE.

In FIG. 11, the wireless user equipment UE includes a C1 antenna 31, a C1 transmission and reception unit 32 that demodulates the reception signal which is received on the channel C1 and performs conversion to digital data, synchronization, decoding, and transmission, that performs modulation of a user data signal, addition of a control signal, and conversion to an analog signal at a carrier frequency on the channel C1, and that performs transmission based on the rule for the random access in the unlicensed band, a C2 antenna 33, a C2 transmission and reception unit 34 that demodulates the reception signal which is received on the channel C2 and performs conversion to digital data, synchronization, decoding, and transmission, that performs modulation of a user data signal, addition of a control signal, and conversion to an analog signal at a carrier frequency on the channel C2, and that performs transmission based on the rule for the transmission in the licensed band, a device control unit 35 that manages an entire device, such as performing control of the user data, the transmission opportunity control unit 36 that, as the transmitting node or the receiving node, controls the obtaining of the transmission opportunity on the channel C1, and a storage unit 37 in which the transmission-waiting user data is stored.

It is possible that the wireless user equipment UE performs wireless communication with any one of the wireless access point AP and the wireless base transceiver station BTS. A scheme for the wireless communication between the wireless user equipment UE and the wireless access point AP or the wireless base transceiver station BTS is arbitrary. For example, any one of schemes, such as Complementary Code Keying (CCK), Single Carrier (SC) transmission, starting with Single-Carrier Frequency Division Multiple Access (SC-FDMA), Orthogonal Frequency Division Multiplexing (OFDM), and Orthogonal Frequency Division Multiple Access (OFDMA), may be used. Furthermore, a scheme that is used for the uplink and a scheme that is used for the downlink may be the same scheme, and be different schemes.

Each node device that constitutes the wireless communication system, such as the wireless user equipment UE, the wireless access point AP, or the wireless base transceiver station BTS, has specific identification information. For the identification information, for example, an IP address of the node device, a tunnel endpoint identifier, a network address, a MAC address specific to the node device, or the like is used. Furthermore, for the identification information on each of the wireless access point AP and the wireless base transceiver station BTS, a Physical Cell ID for identifying a communication cell in which the wireless access point AP or the wireless base transceiver station BTS is formed can be used, and for the wireless access point AP, a Service Set ID (SSID) or an Extended SSID (ESSID) can also be used. The IP address is an address value that uniquely identifies the node device in the wireless communication system. The tunnel endpoint identifier (TEID) is an identifier that identifies a termination point of a GTP tunnel that is a bearer that logically connects the node devices. The network address is an address value that, if the wireless communication system is divided into a plurality of subnetworks, identifies a subnetwork to which the node device belongs. It is possible that the node device within the wireless communication system identifies another node device based on identification information on another node device, and transmits and receives a signal between the node device itself and the another node device that is identified.

A role that is to be played when the uplink communication in which the wireless access point AP that is illustrated in FIG. 3 is the receiving node is performed will be described below with reference to configurations in FIGS. 9 to 11. It is noted that a case of the downlink communication in which the wireless user equipment UE that is illustrated in FIG. 1 is the receiving node is described with the corresponding operation and the matching unit being entered in parentheses.

When the UD report is input into the device control unit 13 through the network communication unit 14 of the wireless access point AP (when the UD report is input into the device control unit 35 through the C2 antenna 33 and the C2 transmission and reception unit 34 of the wireless user equipment UE), the UD report that is input is output to the transmission opportunity control unit 15 (36). In the transmission opportunity control unit 15 (36), in a flow that is illustrated in FIG. 6 or 7, it is decided that the communication based on the obtaining and granting of the transmission opportunity in the receiving node is performed. On this occasion, if the transmission-waiting user data waits in the storage unit 16 (the storage unit 37 of the wireless user equipment UE) of the wireless access point AP, it is decided whether the transmission of the user data based on the obtaining of the transmission opportunity is performed, the reception of the user data based on the obtaining and granting of the transmission opportunity is performed, or both are performed. If the determination of the reception or the transmission is performed, the user data that is transmitted with an enhanced distributed channel access (EDCA) mechanism that uses the access category of the user data of which the transmission is to be performed and the access category of the user data of which the reception is to be performed can be decided. If a communication partner has already sent the user data with the obtaining of the transmission opportunity for the transmission, the priority in obtaining the transmission opportunity for reception may be decreased. If both of the transmission and the reception are performed, the user data of which the transmission is to be performed is decided and the remaining time in the transmission prohibition section is granted, for reception, to the wireless user equipment UE (the wireless access point AP).

When the transmission opportunity control unit 15 (36) decides the communication based on the obtaining and granting of the transmission opportunity, an instruction is provided to the device control unit 13 (35). The device control unit 13 (35) generates, for example, the RTS frame, the CTS frame, the polling frame, the NDP, the NDPR, or the like, as the transmission opportunity-obtaining frame that is designated for the communication based on the obtaining and granting of the transmission opportunity, and transmits the generated frame through the C1 transmission and reception unit 12 (32) and the C1 antenna 11 (31). When the user data is received and the user data that is decoded by the device control unit 13 (35) is obtained, information necessary for determining continuation of or changing a condition for the communication based on the obtaining and granting of the transmission opportunity is input into the transmission opportunity control unit 15 (36) and a determination necessary for the flow in FIG. 6 is performed in the transmission opportunity control unit 15 (36).

Here, if the wireless access point AP performs the communication based on the obtaining and granting of the transmission opportunity, the wireless user equipment UE that obtains the transmission opportunity and is going to perform transmission is not limited to be necessarily the same as the wireless user equipment UE that is going to transmit the user data with the granted transmission opportunity. Because the communication with a plurality of wireless user equipments UE is assumed, the wireless access point AP may perform the transmission of the user data to a wireless user equipment UE different from the wireless user equipment UE of which the transmission opportunity is granted, with the granted transmission opportunity. For this reason, the wireless access point AP determines the transmission opportunity that obtains the transmission opportunity and performs transmission, and the wireless user equipment UE that causes the transmission opportunity which is obtained by the other wireless user equipment UE, to be granted, and performs transmission. For example, the transmission opportunity control unit 15 of the wireless access point AP can decide a waiting time for the user data or a priority, from the access category of the user data, and can decide which wireless user equipment UE the transmission opportunity is obtained from or the transmission opportunity is granted to in the next communication.

The communication based on the obtaining and granting of the transmission opportunity in the receiving node according to the present invention is performed, and thus the extent of the decrease in throughput due to the hidden terminal problem is decreased, but as a side effect, an increase in the number of persons who obtain the transmission opportunity is also considered. That is, if N wireless user equipments UE communicate with the wireless access point AP and pieces of user data over the downlink constitute most of pieces of user data, the wireless access point AP is going to obtain the transmission opportunity for the transmission to the N wireless user equipments UE, per one wireless user equipment UE. If none of wireless stations that use the same channel C1 in the primary frequency band are present in the vicinity, there is no problem. However, if M wireless devices are going to obtain the transmission opportunity on the C1 in the vicinity, the wireless access point AP is going to obtain the transmission opportunity, from persons who have (M+1) transmission opportunities, who also include a person who has the device that itself is going to obtain the transmission opportunity on the C1. When all wireless devices are intended to be always going to obtain the transmission opportunity, it can be expected that 1/(M+1) of wireless resources can be obtained. However, there is a need to further divide the obtained wireless resources by 1/N and transmit the resulting resources. In such a case, if N wireless user equipments UE are caused to obtain the transmission opportunity, because the number of persons who obtain the transmission opportunities is N+1, (N+1)/(M+N+1) of the wireless resources can be made to be obtained. Thus, a system capacity can be improved.

Figure 12:
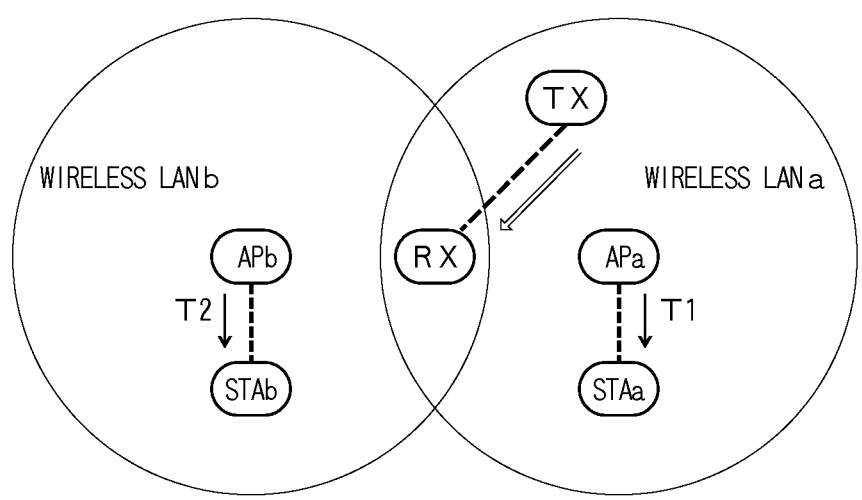
FIG. 12 is a diagram illustrating a first state of a hidden terminal in a transmitting node TX in the wireless communication system.

In order to illustrate an effect of the wireless communication system according to the present invention, simulation by a computer was performed. In the simulation, in a configuration of the wireless communication system that is illustrated in FIG. 12, communication from the transmitting node TX to the receiving node RX is an evaluation target, and if the downlink communication is performed, as illustrated in FIG. 1, the transmitting node TX is the wireless access point AP and the receiving node RX is the wireless user equipment UE. If the uplink communication is performed, as illustrated in FIG. 3, the transmitting node TX is the wireless user equipment UE, and the receiving node RX is the wireless access point AP. In an evaluation model, the wireless access point APa and the wireless station STAa on the wireless LANa, which can be detected in both of the receiving node RX and the transmitting node TX, are present, the wireless access point APb and the wireless station STAb on the wireless LANb, which can be detected only in the receiving node RX, are present, and the communication over the wireless LANb cannot be detected in the transmitting node TX.

Here, traffic in wireless communication from the wireless access point APa to the wireless station STAa on the wireless LANa is intended to be T1 and traffic in communication from the wireless access point APb to the wireless station STAb on the wireless LANb is intended to be T2. In the simulation, throughput of each of the physical links, from the transmitting node TX to the receiving node RX, from the wireless access point APa to the wireless station STAa, and from the wireless access point APb to the wireless station STAb was intended to be 130 Mbit/s. This corresponds to a case where the number of spatial multiplexes is 2, a modulation method is 64 QAM, a coding rate is ⅚, and a guard interval is 800 μs. A time length of the data frame is set to 1.52 ms. The communication from the wireless access point APa to the wireless station STAa and the communication from the wireless access point APb to the wireless station STAb are assumed to be communications that are performed using the RTS/CTS.

Figure 13:
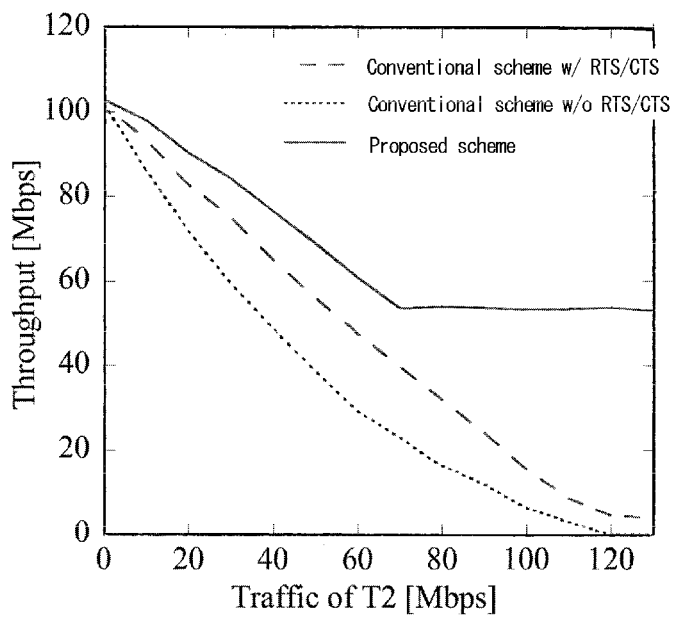
FIG. 13 is a diagram illustrating a characteristic of throughput from the transmitting node TX to a receiving node RX.

FIG. 13 illustrates a characteristic of throughput from the transmitting node TX to the receiving node RX, which results when the traffic T1 on the wireless LANa is set to 20 Mbit/s, and the traffic T2 on the wireless LANb that causes the hidden terminal problem is increased from 0 to 130 Mbit/s.

From a "conventional scheme w/RTS/CTS", which shows a characteristic of throughput that results when the user data is transmitted using the RTS/CTS in communication for obtaining the transmission opportunity in the related art, it is understood that, as the traffic T2 increases, the throughput from the transmitting node TX to the receiving node RX decreases. In a "conventional scheme w/oRTS/CTS", which is a case where the data frame is directly transmitted without using the RTS/CTS, the characteristic is poorest and when the traffic T2 increases, throughput decrease to 0.

A "proposed scheme" is a method in which the communication based on the obtaining and granting of the transmission opportunity in the receiving node according to the present invention is performed. In the "proposed scheme", not only does the transmitting node TX perform the obtaining of the transmission opportunity for the transmitting node TX to perform transmission, but also the receiving node RX performs the obtaining and granting of the transmission opportunity. It is understood that although the traffic T2 increases, the throughput due to the hidden terminal is not greatly decreased, and high throughput can be acquired. It is noted that the RTS/CTS is used for the obtaining of the transmission opportunity.

Figure 14:
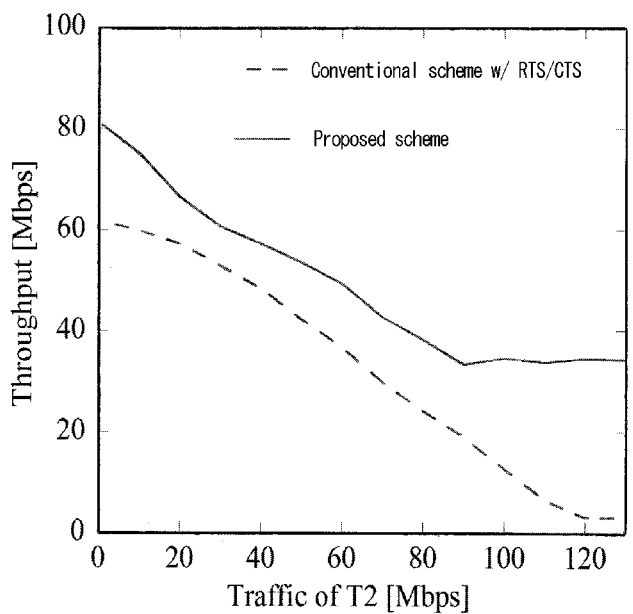
FIG. 14 is a diagram illustrating the characteristic of the throughput from the transmitting node TX to the receiving node RX.

FIG. 14 illustrates the influence of the hidden terminal due to the wireless LANb if the traffic T1 on the wireless LANa is set to 60 Mbit/s and approximately half as many wireless resources are utilized. From the method according to the present invention, in which the communication based on the obtaining and granting of the transmission opportunity in the receiving node, as opposed to the obtaining of only the transmission opportunity that is indicated as the "conventional scheme w/RTS/CTS", is performed, it is understood that although an increase occurs also in a state where the traffic T2 is low, high throughput can be acquired due to an increase in the number of times that the transmission opportunity is obtained.

Next, an effect, based on using the wireless environment information in order to determine whether or not to perform the communication based on the obtaining and granting of the transmission opportunity in the receiving node according to the present invention, is described with reference to FIGS. 15 to 18.

Figure 15:
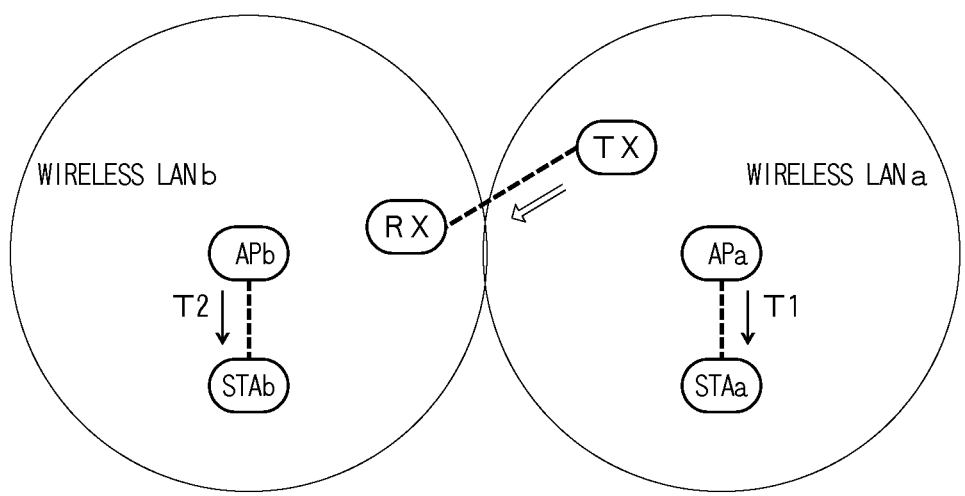
FIG. 15 is a diagram illustrating a second state of the hidden terminal in the transmitting node TX in the wireless communication system.

In the configuration of the wireless communication system that is illustrated in FIG. 15, communication from the transmitting node TX to the receiving node RX is an evaluation target, and if the downlink communication is performed, as illustrated in FIG. 1, the transmitting node TX is the wireless access point AP and the receiving node RX is the wireless user equipment UE. If the uplink communication is performed, as illustrated in FIG. 3, the transmitting node TX is the wireless user equipment UE, and the receiving node RX is the wireless access point AP. In an evaluation model in FIG. 15, the wireless access point APa and the wireless station STAa on the wireless LANa, which can be detected in the transmitting node TX, and the wireless access point APb and the wireless station STAb on the wireless LANb, which can be detected in the receiving node RX, are present, the communication over the wireless LANb cannot be detected in the transmitting node TX, and the communication over the wireless LANa cannot be detected in the receiving node RX. In this situation, different hidden terminal problems occur on the transmitting side and the receiving side, respectively. With the proposed scheme, it can be expected that high throughput is obtained by together using both the obtaining of the transmission opportunity in the transmitting node TX, and the obtaining and granting of the transmission opportunity in the receiving node RX. However, as long as this situation continues without any change, because contribution based on the obtaining and granting of the transmission opportunity in the receiving node RX is not known, the obtaining of the transmission opportunity is individually performed in each of the transmitting node TX and the receiving node RX.

Here, the traffic in the wireless communication from the wireless access point APa to the wireless station STAa on the wireless LANa is intended to be T1 and the traffic in the communication from the wireless access point APb to the wireless station STAb on the wireless LANb is intended to be T2. In the simulation, in the same manner as in FIGS. 12 to 14, the throughput of each of the physical links, from the transmitting node TX to the receiving node RX, from the wireless access point APa to the wireless station STAa, and from the wireless access point APb to the wireless station STAb is defined as 130 Mbit/s, and the time length of the data frame was set to 1.52 ms. On the assumption that the communications from the wireless access point APa to the wireless station STA and from the wireless access point APb to the wireless station STAb are communications that are performed without the RTS/CTS, an amount of traffic in each is randomly set to between 0 Mbit/s and 120 Mbit/s.

Figure 16:
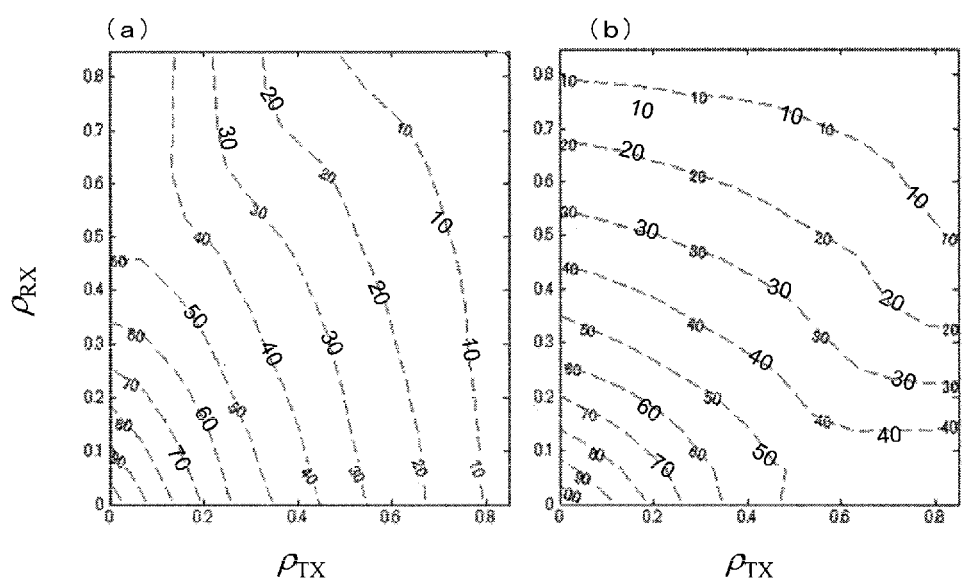
FIG. 16 is a diagram illustrating the characteristic of the throughput from the transmitting node TX to the receiving node RX.

In the present simulation, in the transmitting node TX and the receiving node RX, the channel utilization ρ is measured. In the present simulation, throughput in a packet for a duration of 100 seconds is evaluated, but before that time, measurement was performed for a duration of one second ρ=Tc/T. When a result of the measurement in the transmitting node TX is intended to be $\rho_{TX}$, and a result of the measurement in the receiving node RX is intended to be $\rho_{RX}$, the channel utilization in each is measured to be between 0 to 0.93. FIG. 16 illustrates a result of plotting the throughput from the transmitting node TX to the receiving node RX, which results when excessively heavy traffic is given to the transmitting node TX, against $\rho_{TX}$ and $\rho_{RX}$.

(a) of FIG. 16 is a distribution diagram of throughput that results when the receiving node TX obtains the transmission opportunity for reception. (b) of FIG. 16 is a distribution diagram of throughput that results when the transmitting node TX obtains the transmission opportunity for transmission. It can be ensured that when the channel utilization $\rho_{TX}$ in the transmitting node is low, the throughput does not go down remarkably with the obtaining of the transmission opportunity for reception, which is illustrated in (a) of FIG.

16. On the other hand, although $\rho_{TX}$ is equal to or smaller than 0.1, the throughput goes down to 10 Mbit/s or smaller with the obtaining of the transmission opportunity for transmission that is illustrated in (b) of FIG. 16. This is because the channel utilization that is observed in the transmitting node is wireless traffic information of the wireless station that is hidden from the receiving node RX. In the same manner, the channel utilization that is measured in the receiving node RX corresponds to traffic of the wireless station that is hidden from the transmitting node TX. At this point, when the transmitting node is considered as the wireless access point AP and the receiving node is considered as the wireless user equipment UE, $\rho_{TX}$ is the channel utilization that is measured in the wireless access point AP. Because the wireless environment information that is measured in the wireless access point AP can be collected on the network without passing through a wireless section, the wireless environment information can be collected by the channel access right communication management unit that is connected to the network and can be used for the determination of whether or not the transmission opportunity for the reception in the wireless user equipment UE is caused to be obtained. When $\rho_{TX}$ in FIG. 16 is regarded as the channel utilization that is measured in the wireless access point AP, if obtaining of the channel access right for reception is caused to be performed in the wireless access point AP in which $\rho_{TX}$ is equal to or smaller than 0.1, high throughput of 40 Mbit/s or greater can be expected.

Figure 17:
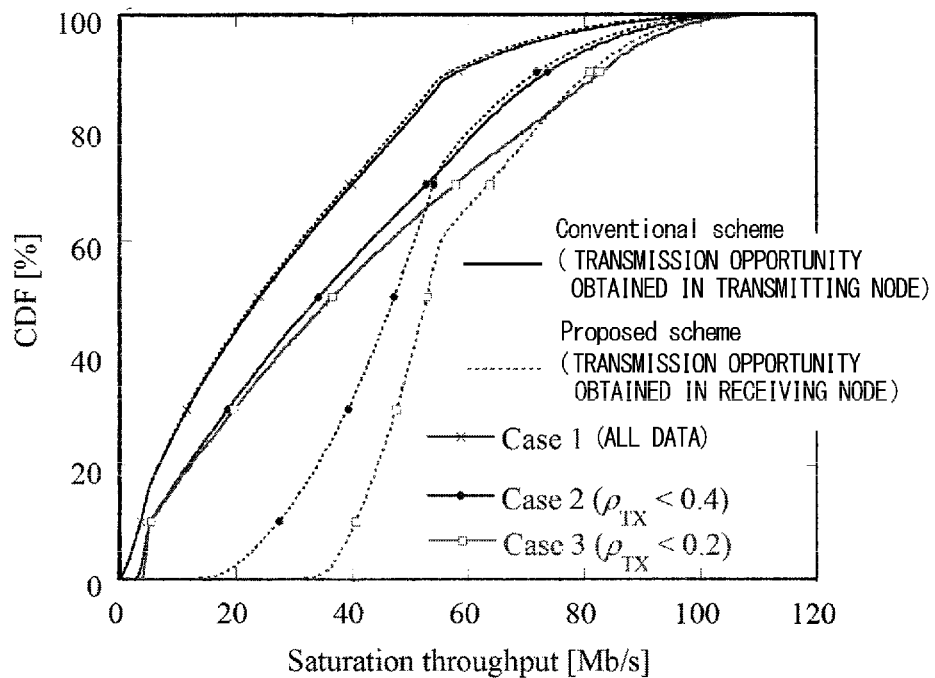
FIG. 17 is a diagram illustrating the characteristic of the throughput from the transmitting node TX to the receiving node RX.

Additionally, in FIG. 17, traffic on each of the wireless LANa and the wireless LANb is randomly set, and a cumulative probability distribution of throughput that was obtained by performing simulation 10,000 times is indicated. Case 1 is a cumulative probability distribution of all pieces of data based on performing simulation 10,000 times, Case 2 is a cumulative probability distribution that results when $\rho_{TX}$ is smaller than 0.4, and Case 3 is a cumulative probability distribution that results when $\rho_{TX}$ is smaller than 0.2. Because traffic that is hidden from both of the transmitting node and the receiving node is randomly given, although a channel access right is obtained for reception, or although a channel access right is obtained for transmission, it is understood that a great difference does not occur in the accumulative probability distribution of the throughput. The reason why throughput of the obtaining of the channel access right for transmission is high to a small degree is that the polling frame is transmitted in a state of being added to the RTS/CTS, in the obtaining of channel access right for reception and thus MAC efficiency is poor to the degree of 2%, while only the RTS/CTS is overhead. It is considered that a gain in the primary frequency band is selected from the channel utilization that is next measured. It is understood that, if the transmitting node in which $\rho_{TX}$ is equal to or smaller than 0.4 is selected, throughput of the channel access right for reception is improved. Particularly, the improvement is great in a region in which the throughput is low. While minimum throughput is 0 Mbit/s in Case 1, minimum throughput is increased up to 13.8 Mbit/s in Case 2 and minimum throughput is increased up to 31.9 Mbit/s in Case 3. On the other hand, if the transmission opportunity is obtained for transmission, great improvement is not found. The channel utilization on the transmitting side is collected and the transmission opportunity for reception is caused to be obtained in the receiving node that corresponds to the transmitting node in which the channel utilization is low. Thus, throughput of an outage user is considerably improved. In the same manner, although a result of the measurement of the channel utilization in the receiving node is collected, the receiving node in which the channel utilization is low is selected, and thus the transmission opportunity for transmission is caused to be obtained, high throughput can be expected.

A relationship between the channel utilization and the throughput depends on a wireless environment. A correspondence between the channel utilization and the throughput changes with the number of and the traffic of wireless stations that can be detected from the transmitting node but cannot be detected from the receiving node, the number of and the traffic of wireless stations that can be detected from the receiving node but cannot be detected from the transmitting node, and the number of and the traffic of wireless stations that can be detected from both of the receiving node and the transmitting node, and with a relationship with whether or not other wireless stations can be mutually detected. If the wireless environment is considerably complex, but the channel utilization that is detected by the transmitting node is low, there is a relationship in which an expected value of throughput that results if the transmission opportunity is obtained by the receiving node is increased. As an example, FIG. 18 illustrates a distribution graph of the throughput for the channel utilization, which results when in a condition in FIG. 16, a wireless LANc that can be detected in both of the transmitting node TX and the receiving node RX is present and communication is performed at a speed of 40 Mbit/s.

Figure 18:
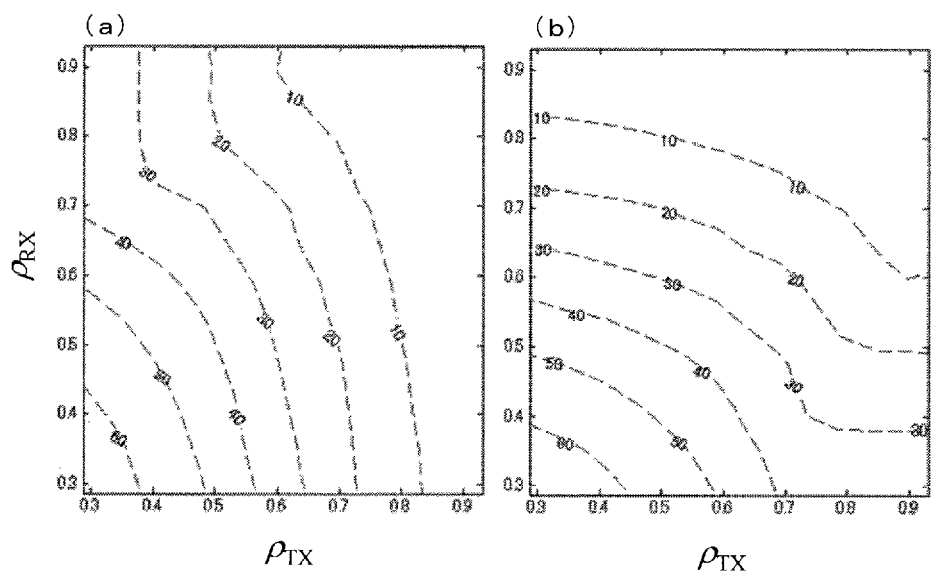
FIG. 18 is a diagram illustrating the characteristic of the throughput from the transmitting node TX to the receiving node RX.

In FIG. 18, the channel utilization is distributed in a range of 0.28 to 0.93, and throughput values change from those that are illustrated in FIG. 16. However, if the channel utilization that is detected in the transmitting node TX is low, it can be ensured that a minimum value of the throughput that results if the transmission opportunity is obtained and granted in the receiving node RX is increased as illustrated in (a) of FIG. 18. In order to consider the wireless environment of the vicinity of the wireless access point AP or the wireless user equipment UE, when it comes to an ID or a position of the wireless access point AP, and a DI, a connection destination, and a position of the wireless user equipment UE, the channel utilization that is measured in the wireless user equipment UE or the wireless access point AP, and the obtained throughput are stored for every person that obtains the transmission opportunity. Thus, the use of a first wireless access point AP and the determination of whether the obtaining of the transmission opportunity in the receiving node is caused to be performed can be performed using throughput values that can be expected from the channel utilization which is measured in the wireless user equipment UE or the wireless access point AP, or a distribution of the throughput values.

A functional unit concerned with the obtaining of the transmission opportunity in the wireless access point AP, the wireless base transceiver station BTS, and the wireless user equipment UE, which are described above, may be realized by a computer. In such a case, the functional unit may be realized by recording a program for realizing each element of the function unit on a computer-readable medium and causing a computer system to read the program recorded on the recording medium for execution. It is noted that the "computer system" here is defined as including an OS and hardware components such as a peripheral device. Furthermore, the "computer-readable recording medium" refers to a portable medium, such as a flexible disk, a magneto-optical disk, a ROM, and a CD-ROM, and a storage device, such as a hard disk, that is built into the computer system. Moreover, the "computer-readable recording media" may include a medium that dynamically retains the program for a short period of time, such as a communication line that is available when transmitting the program over a network such as a network or over a communication circuit such as a telephone circuit, and a medium that retains the program for a fixed period of time, such as a volatile memory within the computer system, which functions as a server or a client if the program is retained dynamically for a short period of time. Furthermore, the program described above may be one for realizing one element of the functional unit described above, additionally be one that can realize each element of the functional unit described above in combination with a program that is already recorded in the computer system, and be one that is realized using a hardware item, such as a Programmable Logic Device (PLD), or a Field Programmable Gate Array (FPGA).

The many features and advantages of the embodiments are apparent from the detailed specification and, thus, it is intended by the appended claims to cover all such features and advantages of the embodiments that fall with the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system which includes: one or more wireless stations having a function of performing wireless communication based on a random access scheme in a primary frequency band and a function of performing the wireless communication in a secondary frequency band which is different from the primary frequency band; a first wireless access point performing the wireless communication with the wireless stations based on the random access scheme in the primary frequency band; and a base transceiver station performing the wireless communication with the wireless stations in the secondary frequency band, in which the first wireless access point communicates with a mobile communications network through the base transceiver station; the system comprising where the first wireless access point is a transmitting node and a given wireless station from the one or more wireless stations is a receiving node, a UD report transfer unit transferring a UD report to the receiving node from the transmitting node through the base transceiver station in the secondary frequency band, the UD report includes information relating to transmission-waiting user data destined for the receiving node from the transmitting node, wherein the receiving node includes a transmission opportunity control unit which, in response to receiving the UD report from the transmitting node, obtains a transmission opportunity in the primary frequency band, and then sets a fixed transmission prohibition time in a channel in the primary frequency band for a wireless communication device in a vicinity and grants the transmission opportunity to the transmitting node using RTS frame of the RTS/CTS process, and causes the user data to be transmitted from the transmitting node.

2. The wireless communication system according to claim 1, wherein the UD report transfer unit is configured to transfer the UD report generated in any one of the first wireless access point, the base transceiver station, and the network to the wireless stations through the base transceiver station.

3. The wireless communication system according to claim 1, wherein:

the first wireless access point and a plurality of the wireless stations are configured to be capable of performing multi-user simultaneous communication;

the UD report transfer unit is configured to transfer the UD report through the base transceiver station between the first wireless access point and the plurality of wireless stations performing the multi-user simultaneous communication; and after the transmission opportunity control unit of the receiving node obtains and grants the transmission opportunity based on the UD report, the first wireless access point is configured to determine whether to perform the multi-user simultaneous communication and then to perform the multi-user simultaneous communication.

4. The wireless communication system according to claim 1, wherein:

the UD report transfer unit is configured to add to the user data which is transmitted from the transmitting node to the receiving node the UD report and to transfer the user data, the UD report includes one of a communication condition, starting and continuation conditions, and a termination command for communication based on the obtaining and the granting of the transmission opportunity in the receiving node; and the transmission opportunity control unit of the receiving node is configured to perform one of update and termination of the condition for the communication based on the obtaining and the granting of the transmission opportunity in the receiving node based on the UD report being added to the user data.

5. The wireless communication system according to claim 1, wherein the UD report transfer unit is configured to determine whether transmission opportunity communication for performing communication based on the obtaining and the granting of the transmission opportunity in the receiving node is possible or not from at least one of wireless environment information measured in the first wireless access point, wireless environment information measured in the wireless stations, traffic information of the base transceiver station, a configuration of a network between the first wireless access point and the base transceiver station, and a type of user grade, and to generate the UD report when the communication based on the obtaining and the granting of the transmission opportunity in the receiving node is determined to be enabled.

6. The wireless communication system according to claim 5, wherein when channel utilization measured at the transmitting node is lower than a predetermined value, the UD report transfer unit is configured to generate the UD report for causing the receiving node to obtain the transmission opportunity.

7. The wireless communication system according to claim 1, wherein the UD report includes an access category of the transmission-waiting user data.

8. The wireless communication system according to claim 1, wherein the UD report includes information designating one of a length of the transmission prohibition time and a change in the length of the transmission prohibition time, the transmission prohibition time being set when the receiving node obtains the transmission opportunity.

9. The wireless communication system according to claim 1, wherein the UD report includes, as information relating to the transmission-waiting user data, at least one of requested throughput of an uplink or a downlink operating in a channel in a first frequency, requested throughput for communication based on the obtaining and the granting of the transmission opportunity in the receiving node in the uplink or the downlink operated in the channel in the first frequency, a presence of the transmission-waiting user data in the transmitting node, a total amount of the transmission-waiting user data in the transmitting node, a number of times that the communication based on the obtaining and the granting of the transmission opportunity in the receiving node is performed, a frequency with which the communication based on the obtaining and the granting of the transmission opportunity in the receiving node is performed, a starting time at which the communication based on the obtaining and the granting of the transmission opportunity in the receiving node is performed, and an instruction to perform one communication based on the obtaining and the granting of the transmission opportunity in the receiving node.

10. A wireless communication method of a wireless communication system which includes:

one or more wireless stations having a function of performing wireless communication based on a random access scheme in a primary frequency band and a function of performing the wireless communication in a secondary frequency band which is different from the primary frequency band;

a first wireless access point performing the wireless communication with the wireless stations in the primary frequency band; and a base transceiver station performing the wireless communication with the wireless stations in the secondary frequency band, in which the first wireless access point and the base transceiver station are connected to each other through a network, the method comprising:

a first step in which any one of the first wireless access point, the base transceiver station, and the network generates information relating to transmission-waiting user data destined for the wireless stations from the first wireless access point as a UD report and aggregates in the base transceiver station;

a second step in which the base transceiver station transfers the UD report aggregated in the first step to the wireless stations in the secondary frequency band; and a third step in which, according to the UD report transferred in the second step, the wireless stations obtains a transmission opportunity in the primary frequency band and then sets a fixed transmission prohibition time in a channel in the primary frequency band for a wireless communication device in a vicinity, grants the transmission opportunity to the first wireless access point using RTS frame of the RTS/CTS process, and causes the user data to be transmitted from the first wireless access point.

* * * * *